Feb. 3, 1953  F. R. McFARLAND  2,627,189
TRANSMISSION
Filed April 12, 1947  4 Sheets-Sheet 1

INVENTOR.
Forest R. McFarland
BY
Milton Tibbetts
ATTORNEY

INVENTOR.
Forest R. McFarland
ATTORNEY

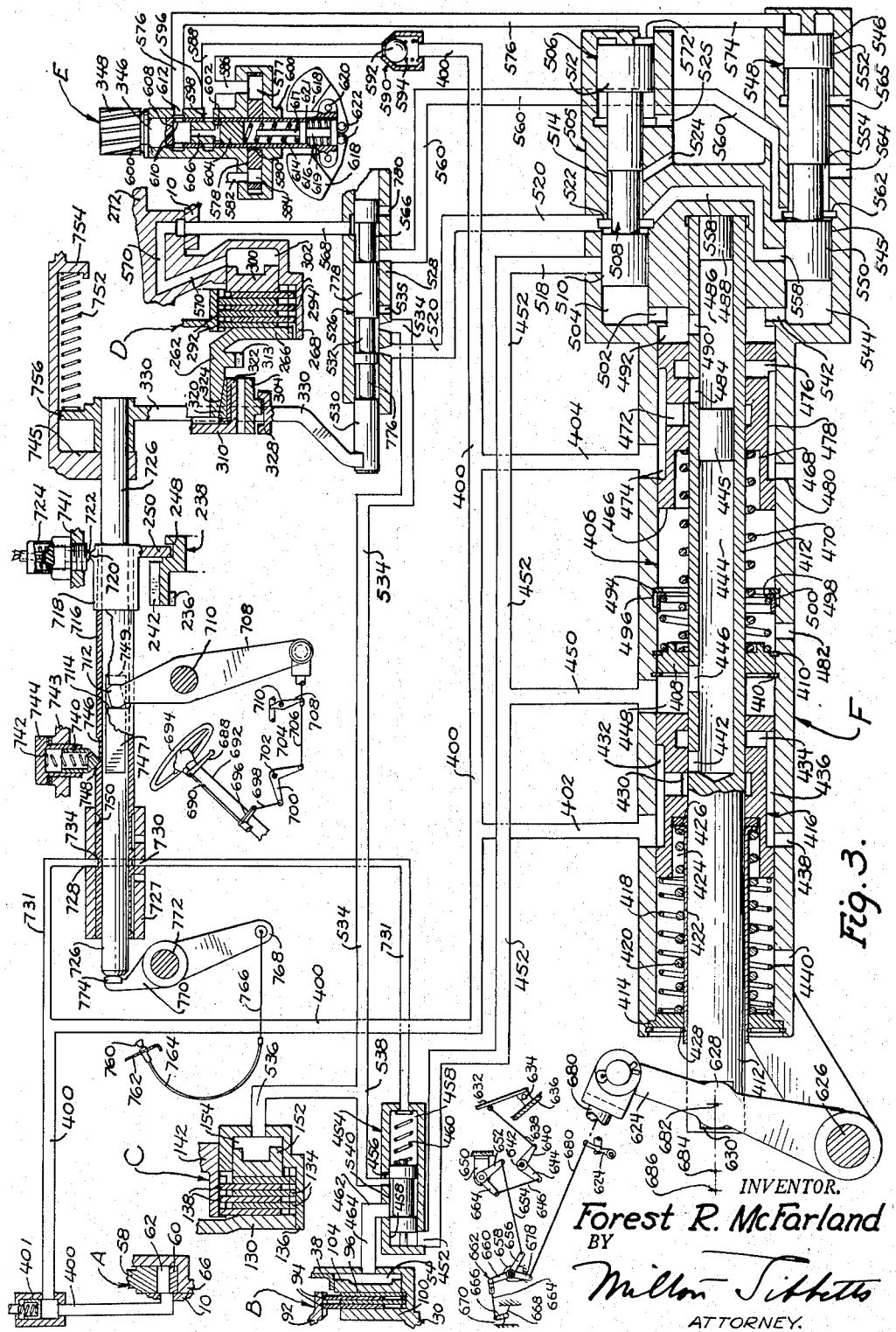

INVENTOR.
Forest R. McFarland
BY
ATTORNEY

Patented Feb. 3, 1953

2,627,189

UNITED STATES PATENT OFFICE 2,627,189

TRANSMISSION

Forest R. McFarland, Huntington Woods, Mich., assignor to Packard Motor Car Company, Detroit, Mich., a corporation of Michigan Application April 12, 1947, Serial No. 741,007

49 Claims. (Cl. 74—645)

This invention relates to transmissions and more particularly to an automatically operable transmission capable of providing high starting torque and transmitting power efficiently at high speeds.

An object of this invention is to provide an improved transmission having cooperating fluid and mechanical units whereby a resilient drive may be initiated through a fluid medium, and the drive may be automatically transferred to a mechanical unit capable of transmitting power efficiently at higher speeds.

A further object is to provide an automatically operable transmission wherein a high starting torque drive is initiated, and the drive is transmitted through successively higher gear ratios by the successive engagement of clutches.

Another object is to provide a multi-speed automatic transmission wherein it is unnecessary to simultaneously engage and release clutch or brake members to effect a shift from one speed ratio to another.

Still a further object of the invention resides in the provision of an improved transmission having a fluid unit to provide high starting torque characteristics and a mechanical gear unit to provide geared and direct drive ratios, wherein the drive is automatically transferred from one speed ratio to another through "pick-up" clutches in such a manner that it is unnecessary to release any of the clutches.

Another object of the invention is to provide a multi speed transmission having a fluid unit connected in series with a mechanical unit in such a manner that the fluid unit may operate successively as a torque converter and as a fluid clutch to provide high starting and accelerating torque characteristics, and wherein a direct drive clutch is provided to interrupt the drive through the fluid unit at high speed.

Yet a further object of the invention resides in the provision of an improved control mechanism actuated by the operator through the accelerator pedal, and influenced by variations of vehicle speed to automatically vary the drive ratio through the transmission in proportion to variations of power available and load to be transmitted.

Another object of the invention resides in the provision of a clutch modulating valve actuated by the accelerator pedal to vary the rate of engagement of a plurality of clutches in proportion to movement of the accelerator pedal in the speed increasing direction.

Still another object is to provide a clutch selector mechanism actuated by the accelerator pedal to successively engage higher speed ratio clutches in response to variations of driven shaft fluid pressure and accelerator pedal controlled driving shaft fluid pressure.

Yet a further object of the invention resides in the provision of an improved transmission control mechanism wherein accelerator pedal actuated members are employed to control the admission of fluid under pressure from a driving shaft pump to fluid pressure balancing chambers to modulate the engagement of a plurality of successively operable clutches, and to oppose successive engagement of said clutches in proportion to speed increasing movement of the accelerator pedal.

Other objects of this invention will appear in the following description and appended claims, reference being had to the accompanying drawings forming a part of this specification wherein like reference characters designate corresponding parts in the several views.

Fig. 3 is a diagrammatic view illustrating the control mechanism of my improved transmission.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
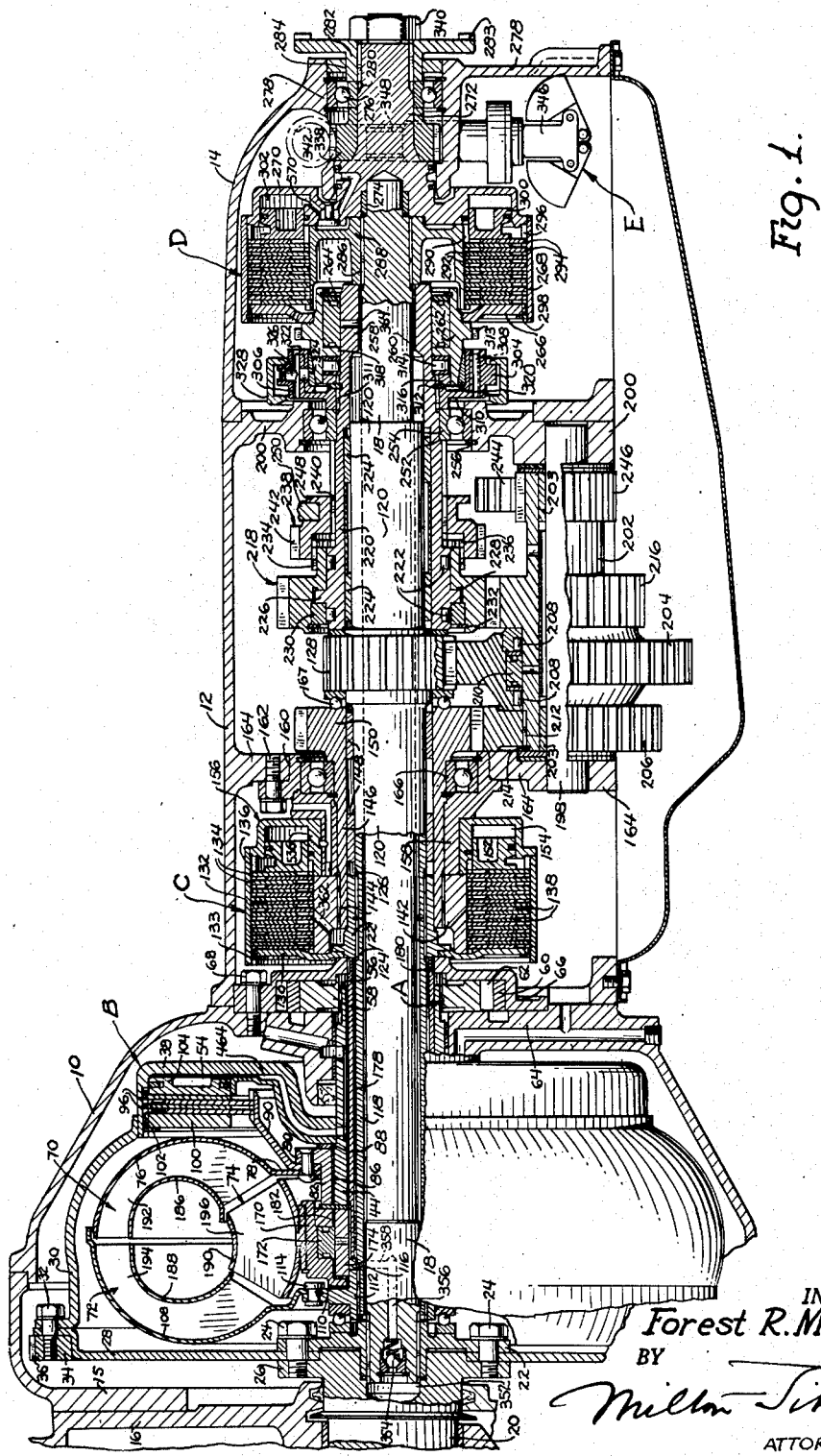
Fig. 1 is a longitudinal sectional view of a transmission embodying the invention.

Referring now more particularly to Fig. 1 it will be noted that the transmission is housed within a casing having front, intermediate and rear sections 10, 12 and 14 respectively. The front section 10 of the casing may be secured in any suitable manner as by means of an adapter 15 to an engine block 16.

Figure 2:
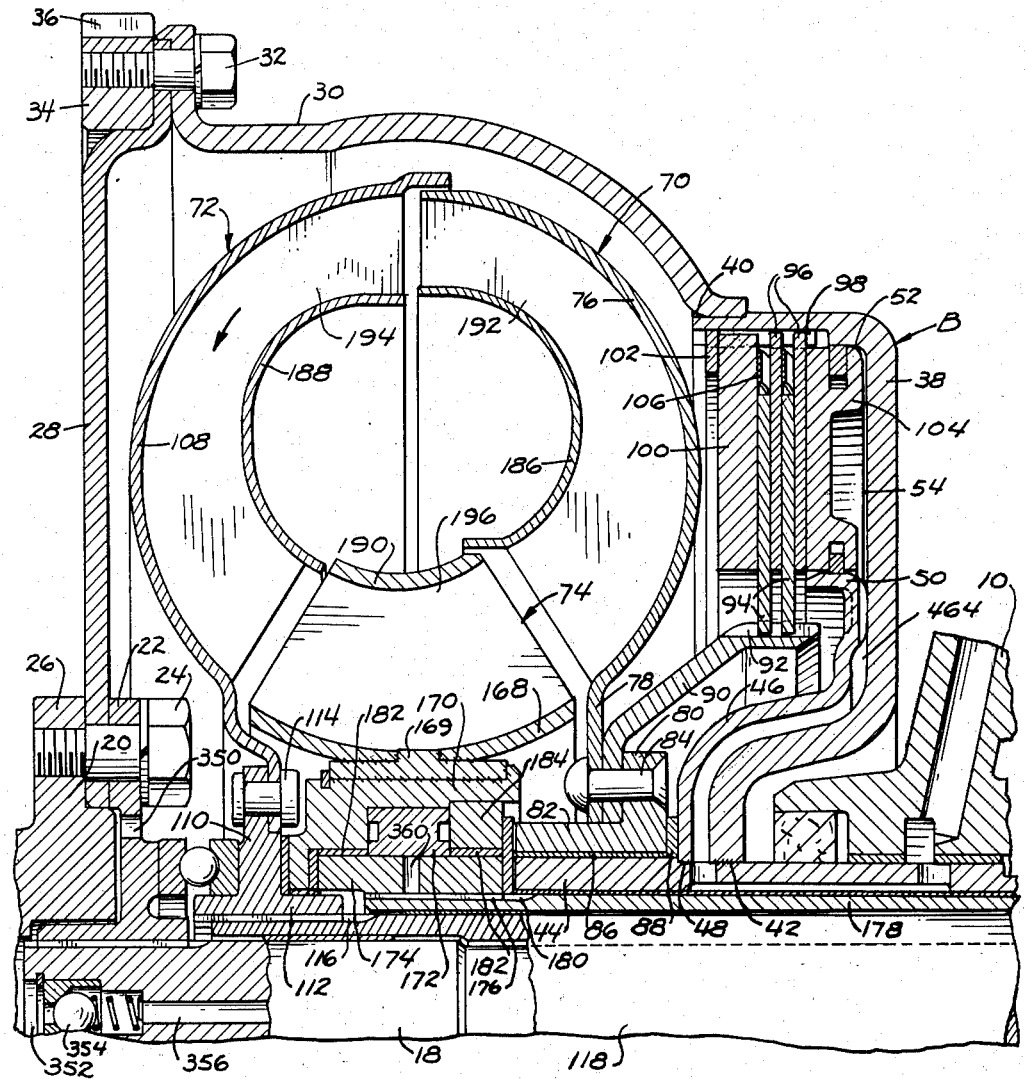
Fig. 2 is an enlarged sectional view of a portion of the device illustrated in Fig. 1.

As shown in Figs. 1 and 2, a central drive shaft 18 extends longitudinally through the transmission, and has its front end secured to a driving shaft, member or crankshaft 20 of the engine in any suitable manner as by means of a hub 22 splined to the front end of the shaft 18 and secured by bolts 24 to a flange 26 carried by the driving member 20. A radially extending rotatable disk 28 is preferably interposed between the hub 22 and the flange 26 and is clamped thereto by means of the bolts 24. An axially extending rotatable shell 30 is secured to the disk 28 as by means of bolts 32 projecting into a starter gear ring 34 having starter gear teeth 36 formed therein. An inwardly extending member 38 for driving a starting clutch B is secured to the axially extending shell 30 in any convenient manner as by welding as illustrated at 40.

The inner end of the clutch driving member 38 is secured as by brazing or welding illustrated at 42 to a sleeve 44 surrounding the central drive shaft 18. A web 46 spaced from the clutch driving member 38 is also secured to the sleeve 44 in any suitable manner as by brazing or welding illustrated at 48. The web 46 is provided with an axially extending portion 50 cooperating with an axially extending portion 52 of the clutch driving member 38 to form a ring type cylinder 54 to receive a piston for engaging the starting clutch B.

The sleeve 44 drives a pump A, the rear end of the sleeve being formed with splines 56 to provide a driving connection with a pump impeller 58 having vanes 60 mounted in a chamber 62 formed between a radially extending wall 64 in the front section 10 of the transmission casing and a cover plate 66 secured to the wall 64 in any convenient manner as by bolts 68.

The torque transmitting fluid unit of the transmission consists of cooperating impeller, turbine and reaction members 70, 72 and 74 housed within the rotatable members 28, 30 and 38 in the front section 10 of the casing as best illustrated in Fig. 2.

The impeller 70 has a contoured web 76 having an inwardly extending flange 78 secured to a flange 80 of a hub member 82 in any suitable manner as by means of rivets 84. The member 82 is rotatably mounted on a bearing 86 surrounding the sleeve 44, which bearing has a flange 88 forming a thrust bearing between the member 82 and the web 46 secured to the sleeve 44.

The driven member of the clutch B is represented at 90 and forms the driving means for the impeller 70. It is interposed between the flanges 78 and 80 and is secured to them as by the rivets 84. The driven member 90 is formed with an axially extending portion having splines 92 to receive the notched inner edges of spaced driven friction clutch disks 94. Driving disks 96 and a backing plate 100, having their outer edges engaging splines 98 formed in the axially extending portion 52 of the member 38 cooperate with the driven clutch disks 94 to drive the impeller 70. A hydraulically actuated ring type piston 104 is slidably mounted in the cylinder 54 formed between the axially extending surfaces 50 and 52 of the members 38 and 46 to urge the driving clutch disks 96 into engagement with the driven disks 94 to drive the impeller.

The backing plate 100 is secured in the clutch cylinder by a snap ring 102 to retain the clutch members. Corrugated clutch plate release springs 106 are preferably interposed between successively spaced clutch disks 96 at the outer ends of the driven disks 94 to yieldingly urge the disks toward the disengaging position.

The turbine member 72 is formed with a web 108 having an inwardly extending flange secured to a flange 110 of an internally splined hub member 112 in any convenient manner as by rivets 114. The splines of the member 112 engage external splines 116 formed on the forward end of an intermediate shaft 118 surrounding the central drive shaft 18. An extension intermediate shaft 120 (see Fig. 1) is aligned with the intermediate shaft 118, and is secured thereto by means of an internally splined clutch driving sleeve 122 engaging splines 124 and 126 formed on the intermediate shafts 118 and 120. The shaft 120 is provided with a driving gear 128 intermediate its ends as illustrated.

A radially extending flange 130 is fixed in any convenient manner to the clutch driving sleeve 122 and is keyed to a clutch cylinder 132. A plurality of spaced clutch driving disks 134 are positioned in the cylinder 132, and are notched to engage splines 136 formed in the clutch cylinder 132. Cooperating driven clutch disks 138 are alternately spaced with respect to the driving disks 134 and have their inner edges notched to engage splines formed in a member 142 secured in any convenient manner as by means of splines 144 to a sleeve type driving shaft 146 rotatably mounted on the driving shaft 120 by means of bearings 148. This shaft 146 is provided with a driving gear 150 of larger diameter than the driving gear 128 carried by the shaft 120, and is spaced axially therefrom as illustrated.

The radially extending flange 130 secured in the clutch cylinder 132 is restrained against axial movement by a snap ring 133, and acts as a backing plate for the clutch disks 134 and 138. A hydraulically operated ring type piston 152 mounted in a cylinder 154 formed in an end closure 156 of the clutch cylinder, is provided to urge the clutch driving disks 134 into frictional engagement with the driven disks 138 to drive the shaft 146 having the driving gear 150 formed thereon.

An axially extending portion 158 of a stationary fitting 160 is provided to support the end closure 156 of the clutch cylinder 132, and this fitting is secured to an inwardly extending web 164 of the housing section 12 as by bolts 162. A bearing 166, shown as a ball bearing, is preferably interposed between a portion of the fitting 160 and a portion of the sleeve driving shaft 146 as illustrated, to support the middle section of the transmission. A thrust bearing 167 is interposed between the end of the sleeve driving shaft 146 and the driving gear 128 formed on the driving shaft 120.

Referring now again to the fluid driving unit it will be noted that the reaction member 74 is formed with a web member 168 secured as by welding or brazing to a ring 169 secured in like manner to a ring 170 rotatably mounted through a one way clutch 172 on a hub 174 having splines 176 securing it to a stationary sleeve 178 having splines 180 locking it to the stationary cover plate 66 bolted to the radially extending wall 64 of the transmission housing. Suitable bearings 182 may be interposed between the ring 170 and the hub 174, a spacer 184 being positioned in the end of the ring 170 to facilitate assembly of the one way clutch 172.

It will be noted that the impeller, turbine and reaction members 70, 72 and 74 are each provided with shrouds 186, 188 and 190 spaced from their respective web members 76, 108 and 168. Spaced generally radially extending impeller, turbine and reaction member vanes 192, 194 and 196 are secured to the impeller, turbine and reaction web and shroud members respectively to induce more positive circulation of fluid.

The impeller vanes are contoured in such a manner as to impart the desired velocity to the fluid to direct it at high velocity to the turbine 72, and the turbine vanes 194 are contoured in such a manner as to enable them to absorb maximum energy from the fluid. The reaction vanes 196 are of appropriate contour and are disposed at suitable angles to deflect the fluid issuing from the turbine 72 and redirect it to the inlet of the impeller 70 in such a manner that increased torque may be transmitted by the fluid device when the reaction member is held against backward rotation in the fluid circuit by the one way clutch 172.

When the relation of the torque required to drive the turbine 72 and the torque applied to drive the impeller 70 is such that the load can be transmitted without torque multiplication, the angular relation of the fluid issuing from the turbine changes to such an extent that no forces tending to rotate the reaction member 74 backwardly are exerted thereon. The reaction member then rotates forwardly in the fluid circuit on the bearings 182 adjacent the one-way clutch 172 thereby transforming the device from a torque converter to a fluid clutch, whereupon power is transmitted at relatively high efficiency with no torque multiplcation.

Referring more particularly to Fig. 1, a layshaft or secondary shaft 198 has one of its ends fixed in the web 164 extending into the intermediate housing section 12, and has its other end fixed in an inwardly directed web 200 positioned at the rear of the housing section 12. A layshaft or secondary sleeve 202 is rotatably mounted on the layshaft 198 through spaced bearings 203. Spaced gears 204 and 206 mounted on the layshaft sleeve 202 mesh with the driving gears 128 and 150 respectively. It will be recalled that the gear 128 carried by the extension intermediate shaft 120 is driven by the turbine 72 through the driving shaft 118, and that the gear 150 is driven by the turbine 72 through shaft 118, the clutch mechanism C and the driving shaft 146.

The gear 204 is mounted on bearings 208 on the layshaft sleeve 202, and a one-way clutch 210 is interposed between the gear 204 and the layshaft sleeve 202 to permit the gear 128 to drive the gear 204 through the one-way clutch 210, or to permit the layshaft sleeve 202 to overrun the gear 204. The gear 206 is fixed to the layshaft sleeve 202 by means of splines 212, and is held against axial displacement on the layshaft sleeve by means of a snap ring 214 extending into a groove formed in the layshaft sleeve 202.

The layshaft sleeve 202 is provided with a gear 216 meshing with a gear 218 mounted on a sleeve 220 on bearings 222, and the sleeve 220 is mounted on bearings 224 on the shaft 120. The sleeve 220 is provided with a radially extending flange 226 projecting into a cylindrical recess 228 formed in the gear 218, and a spacer 230 held against axial movement by means of a snap ring 232 in a groove formed in the cylindrical recess of the gear 218 is provided to maintain desired axial spacing between the gear 218 and the driving sleeve 220.

The gear 216 is provided with axially extending dental clutch teeth 234 meshing with internal teeth 236 carried by an axially movable forward and reverse selector gear 238 having a sliding splined connection 240 with the driving sleeve 220. The selector gear 238 is provided with external gear teeth 242 adapted in one axially shifted position to engage a reverse idler gear 244 driven by a gear 246 carried by the lay-shaft sleeve 202.

The selector gear 238 is provided with a slot 248 to receive a shifter fork 250 illustrated in Figures 1 and 3.

The sleeve 220 is formed with a section 252 of reduced diameter to receive a bearing 254 shown as a ball bearing, supported in the inwardly directed web 200 at the rear of the intermediate housing section 12 to maintain desired alignment between these portions of the transmission. The bearing is restrained from forward displacement in the web 200 by means of a snap ring 256 as illustrated.

The rear end of the sleeve 220 projects into the rear section 14 of the housing. A section 258 of the sleeve 220 is drivingly connected with a clutch driving member 262 through a one-way clutch 264. Also between the sleeve 220 and the driving member 262 is a bearing 314, and the driving member 262 is provided with a driving flange 266 secured to a clutch cylinder 268 fixed to a driving flange 270 of a final driven shaft or member 272 aligned with sleeve 220.

The final driven shaft 272 is journaled in a bearing 276 shown as a ball bearing positioned in the rear end of the casing section 14. The bearing 276 is restrained against axial displacement in the end of the casing by means of spaced snap rings projecting into grooves as illustrated. The final driven shaft 272 is provided with external splines 280 engaging a power output connector having a splined sleeve 282 and a flanged connector 283 to receive a universal driving connection. A seal 284 surrounds the sleeve 282 of the output connector to seal the end closure of the casing section.

The rear end of the central driving shaft 18 is supported in final driven shaft 272 on a bearing 274, and is provided with external splines 286 to engage a clutch driving member 288 having external splines 290 to receive clutch driving disks 292 of a direct drive clutch D. Clutch driven disks 294 are alternately spaced with the clutch driving disks 292 in the clutch cylinder 268, and have their outer edges notched to engage splines 296 formed in the clutch cylinder 268. A snap ring 298 projecting into a groove formed in the clutch cylinder 268 is provided to prevent axial displacement of the clutch cylinder relative to the driving flange 266 secured to the clutch driving member 262. A hydraulically actuated ring piston 300 positioned in a cylinder 302 formed in the driving flange 270 of the final driven shaft 272 is provided to urge the driving and driven clutch disks 292 and 294 into driving engagement.

In order to permit a reverse drive to be transmitted around the one way clutch 264 interposed between the clutch driving member 262 and the rear end 258 of the driving sleeve 220, a coupler 304 having internal teeth 306 is slidably mounted on external teeth 308 carried by a member 310 secured to the driving sleeve 220 by splines 311, and held in place axially by a snap ring 312 to engage a gear 313 on the clutch driving member 262.

Referring to Figs. 1 and 3, a synchronizer cone type brake 320 adapted to be engaged by initial axial shifting of the coupler 304 through an actuator 322 is provided to engage a conical surface 324 on the clutch driving member 262 to synchronize the speeds of the sleeve 220 and the clutch driving member 262 when shifting into the reverse gear. A spring pressed plunger 326 is employed to exert a yielding force urging the synchronizer cone 320 into engagement with the conical surface 324 of the clutch driving member 262 when the coupler 304 is moved axially through a coupler shifter 328. The coupler shifter 328 is actuated through an arm 330 upon movement of the manually operable selector lever to the reverse position as hereinafter more fully described as illustrated in Fig. 3.

Means for driving a governor are provided in the form of a gear 338 clamped to the final driven shaft 272 by means of a nut 340 exerting a clamping action through the sleeve 282 of the output connector and the inner cage of the bearing 276 to urge the forward end of the gear 338 into engagement with a radially extending flange of the final driven shaft 272. A speedometer driving gear 342 is driven by the gear 338 as illustrated, and a governor mechanism E has a central shaft 346 driven through a gear 348 meshing with the gear 338 as illustrated in Figs. 1 and 3.

This improved transmission provides a plurality of forward speed ratios derived in the following manner. When high torque is required as when starting a vehicle, fluid pressure is exerted in the hydraulic cylinder 54 to engage the starting clutch B thereby transmitting a drive through the clutch plates 96 and 94 to rotate the impeller 70. Rotation of the impeller is effective through the vanes 192 to energize fluid and direct it to the turbine 72 where the vanes 194 absorb energy from the circulating fluid, and direct the fluid to the reaction member 74. The reaction member vanes 196 change the direction of flow of the fluid issuing from the outlet of the turbine and redirect it to the inlet of the impeller in such a manner that power is transmitted under torque multiplying conditions.

Energy absorbed from the circulating fluid by the turbine 72 is transmitted through the turbine web 108, flange 110 and hub 112 to the intermediate shaft 118 connected through the clutch driving sleeve 122 to drive the shaft 120 aligned therewith and having the driving gear 128 fixed thereto. The gear 128 meshing with the gear 204 drives the layshaft sleeve 202 through the one way clutch 210. Rotation of the layshaft sleeve 202 is transmitted through the gear 216 to drive the gear 218 rotatably mounted on the driving sleeve 220. With the selector gear 238 in the forwardly driving position, the internal teeth 236 fully engage the dental clutch teeth 234 of the gear 218, to drive the sleeve 220. The rear end 258 of the sleeve 220 drives the clutch driving member 262 through the one way clutch 264 whereupon power is transmitted through the driving flange 266, clutch cylinder 268 and flange 270 to rotate the tailshaft 272 and output connector 282. A high torque low speed ratio drive is thus provided to start the vehicle in motion.

As the vehicle accelerates to a point that high torque multiplication is no longer required, the discharge angle of the fluid issuing from the turbine 72 is deflected to such a point that it does not exert a reaction force on the vanes 196 of the reaction member 74. The reaction member then rotates on the one way clutch 172 in the forward direction in the fluid circuit and the device operates as a fluid clutch to transmit power at high efficiency with no multiplication of torque. The torque delivered by the fluid unit to the final driven shaft 272 is of course multiplied by the gear unit, and is delivered through the same gears as the drive when the fluid unit is operating as a torque converter.

When the vehicle has been accelerated with the fluid unit operating as a fluid clutch to such a point that the power supplied by the engine to the impeller 70 can drive the vehicle at a higher speed ratio, or with less torque multiplication, the clutch C is automatically engaged to effect a higher speed ratio drive. The torque from the turbine 72 transmitted through the intermediate shaft 118 is then directed through the clutch driving sleeve 122 interconnecting the shafts 118 and 120, radially extending flange 130, clutch cylinder 132, clutch disks 134 and 138 and member 142 to drive the shaft 146 having the gear 150 thereon. The gear 150 being of larger diameter than the gear 128 and meshing with the countershaft sleeve gear 206 of smaller diameter than the gear 204 will drive the countershaft sleeve 202 at a higher speed ratio drive.

The layshaft sleeve 202 overruns the gear 204 through the one way clutch 210 to permit the drive of the layshaft sleeve 202 to be transmitted through the gears 150 and 206. Increased relative speed of the layshaft sleeve 202 is transmitted through the gears 216, 218 and selector gear 238 to rotate the sleeve 220 at higher relative speed, whereupon the final driven shaft 272 is rotated faster for a given turbine speed. The fluid unit continues to operate as a fluid clutch to transmit power at high efficiency with no multiplication of torque, and the ratio of the gear unit is changed when the intermediate speed clutch C is engaged to transmit power at a higher speed ratio. It will be noted that to shift to the higher geared speed ratio it is only necessary to engage the clutch C, the starting clutch B remaining engaged.

As the vehicle continues to accelerate to such a point that a still higher gear ratio is desirable, the direct drive clutch D is engaged, whereupon the drive is transmitted from the driving member 20 of the engine through the hub 22 to the central driving shaft, then through the clutch driving member 288 splined to the rear end of the shaft 18, and through the clutch plates 292 and 294, clutch cylinder 268 and flange 270 to the final driven shaft 272 to drive the tailshaft at a 1 to 1 ratio with the engine crankshaft or driving member 20.

To engage this direct drive, it is only necessary to engage the direct drive clutch D, the clutches B and C remaining engaged and being overrun by the one-way clutches 210 and 264. There will be virtually no losses through the fluid unit because the impeller and turbine members 70 and 72 rotate at substantially the same speed.

Means are provided for lubricating certain of the elements of the transmission by oil from the circuit of the fluid unit. Fluid from the power transmitting fluid circuit passes through apertures 350 in the hub 22 through a groove to a chamber 352 in the rear end of the driving member or crankshaft 20. The pressure in the chamber 352 actuates a check valve 354, and the fluid flows through an axial bore 356 to a radial bore 358 in the central driving shaft 18. A portion of the lubricating fluid then flows through proper clearances around the forward end of driving shaft 118 and through radially extending holes 360 to lubricate the one way clutch 172. A portion of this fluid flows rearwardly between the associated shaft and sleeve members to lubricate other portions of the transmission including the disks of the intermediate drive clutch C by fluid admitted thereto through apertures 362. Another portion of the fluid flows rearwardly between the central driving shaft 18 and its associated elements to lubricate the one way clutch 264 by fluid admitted through apertures 364. This fluid also lubricates other elements of the transmission requiring lubrication, including the disks of the direct drive clutch D.

Referring to Fig. 3 some of the control elements are indicated as follows: Engine driven pump A, starting clutch B, intermediate clutch C, direct drive clutch D, governor E and valve mechanism F.

A conduit 400 communicating with the outlet side of the engine driven pump A is provided with branch conduits 402 and 404 communicating with clutch modulating and selector valve assemblies positioned in a cylinder 406. The cylinder 406 has an abutment 408 positioned intermediate its ends and held in position axially by snap rings 410. It will be apparent that if desired the clutch modulating and clutch selector valve assemblies can be positioned in separate chambers rather than being positioned in the cylinder 406. An accelerator pedal actuated plunger valve 412 is slidably mounted in the cylinder 406, and is guided therein by the abutment 408, and by an end enclosure 414 as illustrated.

A clutch modulating valve 416 is preferably positioned in the forward end of the cylinder 406, and is slidably mounted on the valve plunger 412. A low rate spring 418 interposed between the forward end of the valve 416 and the end closure 414 is provided to yieldingly urge the valve 416 toward the abutment 408. A higher rate spring 420 of the so-called caged type is positioned on a sleeve 422 slidably mounted on the valve plunger 412 and extending into an undercut section 424 in the forward end of tthe valve 416. The sleeve 422 is provided with a radially extended flange 426 positioned in the undercut section 424 of the valve 416 whereby the force of the spring 420 is transmitted to the valve through the cage. A keeper 428 in the form of a snap ring is positioned in a groove formed in the sleeve 422 to contact the end closure 414 to limit axial movement of the sleeve 422 rearwardly in the valve opening direction.

The clutch modulating valve 416 is provided with a radially extending inlet port 430 communicating with an axially extending groove 432 adapted to communicate with the branch conduit 402 of the conduit 400 connected with the pump A driven by the engine. The valve 416 is provided with a radially extending vent passage 434 connected with an axially extending groove 436 in communication with a vent passage 438. Another vent passage 440 communicates with the space within the cylinder 406 forwardly of the clutch modulating valve 416 to permit the escape of any liquid passing between the clutch modulating valve 416 and the valve plunger 412.

The valve plunger 412 is provided with a radially extending inlet port 442 communicating with an axially extending bore 444, a plug 445 being positioned in the bore 444 to limit the axial length of the bore. A radially extending outlet port 446 interconnects the bore 444 with in the valve 412 interconnects the bore 444 with a fluid pressure balancing chamber 448 between the abutment 408 and the rear end of the valve 416. An outlet passage 450 communicating with the chamber 448 connects with a conduit 452 in communication with a starting clutch valve 454 having a plunger 456 slidably mounted in a cylinder 458, and yieldingly urged by a spring 460 in the closing direction. An outlet port 462 spaced from the forward end of the cylinder 458 communicates with a conduit 464 extending to the cylinder 54 of the starting clutch B.

When the pressure transmitted through the conduit 452 is sufficient to move the starting valve piston 456 in the cylinder 458 against the resistance of the spring 460 to open the outlet port 462, fluid under pressure will be directed to the cylinder 54 of the starting clutch B to engage said clutch and rotate the impeller 70 of the fluid device. The trapped spring 420 in the valve mechanism F insures the building up of sufficient pressure in the pressure balancing chamber 448 to move the piston 456 to admit pressure to the starting clutch B immediately upon opening the engine throttle by the accelerator pedal, as will be hereinafter described.

A clutch selector control mechanism is provided to successively engage the intermediate and direct drive clutches C and D. This mechanism includes a valve 466 slidably mounted in the cylinder 406 of the valve mechanism F rearwardly of the abutment 408. The valve 466 is provided with a radially extending inlet port 472 communicating with an axially extending groove 474 adapted to communicate with the branch conduit 404 to receive fluid from the conduit 400. A radially extending vent passage 476 communicates with an axially extending groove 478 adapted to align with a vent passage 480 extending through the walls of the cylinder 406. An auxiliary vent passage 482 interposed between the abutment 408 and the valve 466 is provided to permit the escape of any fluid leaking between the valve 466 and the valve plunger 412.

The valve plunger 412 is provided with a radially extending inlet port 484 adapted to communicate with the port 472. The inlet port 484 communicates with an axially directed bore 486 in the valve plunger 412, and extends between the plug 445 and a plug 488, the latter positioned adjacent the rear end of the valve plunger 412.

A radially extending outlet port 490 spaced axially from the inlet port 484 is formed in the wall of the valve plunger 412 to communicate with a fluid pressure balancing chamber 492 positioned at the rear end of the clutch selector valve 466. A spring 470 interposed between the abutment 408 and an undercut forward portion 468 of the valve 466 is provided to yieldingly urge the valve rearwardly in the opening direction.

A kickdown control mechanism operable to engage the intermediate speed clutch C and disengage the direct drive clutch D is provided to permit more rapid acceleration of the vehicle under certain conditions of operation than is available when the transmission is operating in direct drive. A snap ring 494 positioned in a relatively wide annular groove 496 formed in the wall of the cylinder 406 is yieldingly urged by a spring 498 interposed between the abutment 408 and a guide 500 contacting the snap ring 494 to increase the force urging the clutch selector valve 466 in the valve opening direction when the valve 466 is moved forwardly in the cylinder as a result of movement of the accelerator pedal and plunger 412 to the kickdown position as hereinafter described.

The fluid pressure balancing chamber 492 communicates through a passage 502 with the forward end 504 of a compound intermediate speed cylinder 505 having a rear end 506 of suitable diameter, preferably but not necessarily larger than the end 504. A compound piston 508 has a forward section 510 slidably mounted in the forward end 504 of the cylinder 505 and a rear section 512 of suitable diameter slidably mounted in the rear section 506 of the compound cylinder.

The piston 508 also has a section 514 of reduced diameter connecting the sections 510 and 512.

A conduit 518 communicating with the conduit 452 supplied with fluid under pressure from the clutch modulating pressure balancing chamber 448 through the passage 450 is employed to supply fluid to the small diameter section 504 of the compound cylinder behind the small diameter section 510 of the compound piston 508 when the piston is moved forwardly by fluid pressure supplied from the governor E driven by the final driven shaft 272 and exerted in the large diameter section 506 of the compound cylinder 505.

A conduit 520 communicates with the space within the cylinder 505 at a point spaced rearwardly from the conduit 518. This spacing is such that when the piston 508 is in its forward position, the section of reduced diameter 514 of the piston 508 interconnects the conduits 518 and 520 to supply fluid to the conduit 520 from the clutch modulating pressure balancing chamber 448 to engage the intermediate speed clutch C.

A vent passage 524 communicates with the space within the cylinder 505 at a point spaced rearwardly from the conduit 520. This spacing is such that when the piston 508 is in its rearmost position illustrated in Fig. 3, the section of reduced diameter 514 of the piston 508 interconnects the conduit 520 with the vent passage 524 to vent the intermediate speed clutch C to disengage it.

When the piston 508 is in the forward position fluid under pressure to engage the intermediate speed clutch C is directed by the conduit 520 to a cylinder 526 of a valve mechanism 528 having a plunger 530 slidably mounted therein. This plunger 530 is provided with a section 532 of reduced diameter to interconnect the conduit 520 with a conduit 534 having a branch 536 extending to the cylinder 154 of the intermediate speed clutch C. A branch conduit 538 of the conduit 534 communicates with the central portion of the cylinder 458 of the starting valve 454 as illustrated to direct fluid through a section 540 of reduced diameter of the piston 456 to the conduit 464 communicating with the cylinder 54 of the starting clutch B when the piston 456 is yieldingly held by the spring 468 to the front end of the cylinder 458. This arrangement insures that the starting clutch B will be engaged when the intermediate speed clutch C is engaged, even though the accelerator pedal is released. This arrangement also provides for venting of the starting clutch B in the low speed ratio with the accelerator pedal released because the piston 508 is positioned rearwardly thus interconnecting conduits 464, 534 and 520 with the vent passage 524 in the cylinder 514. The intermediate speed clutch C is of course also vented through the conduits 536, 534, 520 and 524 in the same manner when the valve 508 is in its rearward position. A vent 525 is provided forwardly of the rear section 512 of the cylinder 506 as illustrated.

The clutch selector pressure balancing chamber 492 also communicates through a passage 542 with the forward end 544 of a direct drive cylinder 545 having a rear end 546 of suitable diameter. A compound piston 548 is provided with a front section 550 slidably mounted in the forward end of the cylinder 545 and a rear section 552 slidably mounted in the rear end 546 of the cylinder 545. The piston 548 is also formed with an intermediate section 554 of reduced diameter.

A conduit 558 communicating with the forward section 504 of the intermediate speed cylinder 505 is employed to supply fluid to the direct drive cylinder 545 behind the front section 550 of the compound piston 548 when the intermediate and direct drive pistons 508 and 548 are moved forwardly in their respective cylinders by fluid pressure supplied from the governor E driven by the final driven shaft 272. A conduit 560 communicates with the space within the cylinder 545 at a point spaced rearwardly from the conduit 558. This spacing is such that when the piston 548 is in its forward position, the section of reduced diameter 554 of the piston 548 interconnects the conduits 558 and 560 to supply fluid to the conduit 560 from the clutch modulating pressure balancing chamber 448 to engage the direct drive clutch D.

A vent passage 564 communicates with the space within the cylinder 545 at a point spaced rearwardly from the conduit 560. The spacing of the vent passage is such that when the piston 548 is in its rearmost position illustrated in Fig. 3, the section of reduced diameter 554 of the piston 548 interconnects the conduit 560 with the vent passage 564 to vent the direct drive clutch D to disengage it. A vent 565 is provided forwardly of the rear section 552 of the compound piston 548.

The conduit 560 communicates with the cylinder 526 of the valve mechanism 528 adjacent a section 566 of reduced diameter of the plunger 530. A conduit 568 communicating with the space adjacent said section 566 of the plunger when the plunger is in the forward position directs fluid to passages 570 communicating with the cylinder 302 of the direct drive clutch D.

The rear sections 512 and 552 of the pistons 508 and 548 are subjected to fluid pressure proportionate to the speed of the vehicle through branch conduits 572 and 574 communicating with a conduit 576 from the governor E to urge the pistons forwardly in opposition to the forces exerted by the fluid from the clutch selector balancing chamber 492 exerted on the front sections 510 and 550 of the pistons. The pistons 508 and 548 controlling engagement of the clutches C and D are therefore responsive to the speed of the vehicle and the position of the accelerator pedal controlling the torque of the engine.

It will be understood that the diameters of the rear ends 512 and 552 of the compound pistons 508 and 548 may be such as necessary to effect engagement of the intermediate and direct drive clutches upon the attainment of desired vehicle speed and engine torque ratios. It will also be apparent that, if desired, springs may be employed in connection with the pistons to augment or oppose fluid pressure acting in either direction to accelerate or delay movement of the control pistons to the clutch engaging positions.

The governor E has a pump 577 preferably designed to develop substantially constant fluid pressure regardless of the speed at which it is driven. The pump may have a ring 578 provided with vanes which move eccentrically in proportion to the quantity of fluid demanded to maintain substantially constant pressure, such for example as 80 pounds per square inch when operating at relatively slow speed. The impeller is connected through a driving connection 580 to the governor driving shaft 346 which is driven by the final driven shaft 272 through gears 348 and 338. The pump is supplied with fluid from an inlet 582 to a pumping chamber 584 having an outlet 586 communicating through a conduit 588 with a check valve 590 interposed between the conduit 588 and the conduit 400. The check valve may be of any convenient type such for example as a ball 592 yieldingly urged by a spring 594 to close the outlet from the conduit 588 except when the pressure exerted therein is sufficient to overcome the resistance of the spring 594 and the pressure exerted in the conduit 400.

For operating the clutch selector valve mechanism, the substantially constant pressure supplied by the pump 577 is controlled to provide pressure substantially proportional to the speed of the driven shaft up to a vehicle speed of say fifty-three miles per hour, and at higher speeds to develop fluid pressure substantially proportional to the square of the speed.

The outlet 586 from the pump 577 of the governor E communicates with a conduit 596 connected with an inlet port 598 in a casing 600 housing the pump mechanism. The port 598 communicates under certain conditions of operation with a cross bore 602 formed in a movable plunger 604 having a longitudinal bore 606 extending to a pressure balancing chamber 608 connected through suitable outlets including radially extending passages 610 in the shaft 346 and a port 612 in the casing 600 with the conduit 576.

A spring 614 interposed between the plunger 604 and a speed controlled plunger 616 urges the plunger 604 upwardly to increase communication between the ports 598 and the cross bore 602 to admit an increased flow of fluid to the pressure balancing chamber. The pressure exerted in the pressure balancing chamber 608 forces the plunger 604 downwardly to reduce communication between the ports 598 and the cross bore 602 to decrease the flow of fluid to the chamber 608.

A plurality of centrifugal weights 618 pivoted on the shaft 346 at 620 are provided with actuating members 622 engaging the plunger 616 to move the plunger upwardly to increase the force exerted by spring 614 as the speed of rotation of the final driven shaft 272 increases.

As communication between the ports 598 and cross bore 602 increases due to an increase of vehicle speed, fluid under pressure from the pump 577 flows through the outlet 586, branch conduit 596, port 598, cross bore 602, longitudinal bore 606 to the pressure balancing chamber 608 where increased fluid pressure exerts a force tending to move the plunger 604 downwardly against the resistance of the spring 614 to restrict or cut off communication between the port 598 and the cross bore 602. The centrifugal force of the weights is of course a radial load proportional to the square of the speed. The geometry of the linkage is such that the increase of centrifugal force due to increase in speed, causes spring 614 to compress thereby reducing the mechanical advantage of the weight linkage with respect to the load on the axial plunger 604 resulting in a net force axial against the plunger 604 proportional to the first power of the speed. This results in the pressure in conduit 576 being proportional to the first power of, or directly with, speed.

The centrifugally actuated plunger 616 is provided with an upstanding projection 617 adapted to engage the bottom of the plunger 604 and move it upwardly proportionately to an increase of vehicle speed above the suggested fifty three miles per hour. By reason of such engagement, further upward movement of the plunger 604 increases the communication between the inlet ports 598 and 602 to provide increased fluid pressure substantially proportional to the square of the speed.

Means are provided to actuate the valve plunger 412 in response to throttle opening movement of the accelerator pedal. A lever 624 pivoted at 626, has a rounded valve plunger actuating portion 628 positioned in a slot 630. The lever 624 is actuated by any convenient linkage connected to move the plunger 412 in proportion to movement of an accelerator pedal 632 pivoted at 634 on the toe board 636 of the vehicle.

One illustrative form of actuating mechanism includes a link 638 interposed between the accelerator pedal 632 and an arm 640 of a bell crank pivoted at 642 and having its other arm 644 connected by a link 646 connected to an arm 664 of another bell crank pivoted on a bracket 650. The other arm 652 of this bell crank is connected through a link 654 with one arm 656 of a three armed bell crank pivotally mounted on a bracket 658 and having another of its arms 660 connected through a yielding connection 662 with a link 664 connected to a throttle actuating lever 666 secured to a shaft having a throttle valve 668 positioned to move between open and closed positions in an induction passage 670 of a carburetor. The other arm 678 of the three armed bell crank is connected through a link 680 to the lever 624 which actuates the valve plunger 412.

Figure 4:
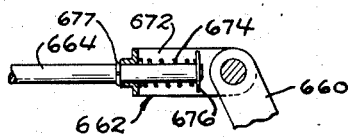
Fig. 4 is an enlarged part sectional view of the element 662 illustrated in Fig. 3.

The yielding connection 662, more fully illustrated in Fig. 4, includes a yoke 672 pivoted to the arm 660 and having an apertured end portion to receive the end of the link 664. A spring 674 is interposed between the yoke 672 and the end 676 of the link 664. A snap ring 677 carried by the link 664 is provided to limit axial movement of the yoke 672 on the link 664 to permit the accelerator pedal 632 to move beyond the throttle open position.

The linkage between the accelerator pedal 632 and the lever 624 to actuate the valve plunger 412 is shown diagrammatically and not to scale. This linkage is so proportioned that when the throttle valve 668 is in the closed position as illustrated, and the accelerator pedal 632 is released, the lever 624 actuating the plunger 412 is in the position indicated at 682. When the accelerator pedal 632 is actuated to move the throttle valve 668 to the fully opened position, the lever 624 will be moved to the position indicated at 684. When the accelerator pedal 632 is still further depressed after the full throttle position has been reached, the lever 624 will be moved to the kickdown position indicated at 686, the yielding connection 662 permitting the linkage to move beyond the throttle open position.

A manually operated forward and reverse selector lever 688 carried by a rod 690 extending along a steering column 692 having a steering wheel 694 mounted thereon is provided to enable the operator to select the forward or reverse drive position. An arm 696 fixed to the rod 690 is connected through a link 698 to an arm 700 of a bell crank pivoted at 702 and having its other arm 704 connected through a link 706 with an arm of an actuating lever 708 pivoted at 710, and having a rounded actuating end portion 712 positioned in a slot 714 of a shifter sleeve 716. The shifter fork 259 illustrated in Figures 1 and 3 is secured to the shifter sleeve 716 through a hub 718 having a cam 720 to move a switch actuating member 722 to close a switch positioned in a chamber 724 to complete a circuit through the engine starter when the selector lever 688 is in the engine disconnected or starting position shown in Fig. 3.

A detent 740 is urged by a spring 742 in a casing 744 into engagement with one of a series of conical indentations 746, 748 and 750 corresponding with the forward, engine starting, and reverse positions of the shifter sleeve 716 to yieldingly resist movement of the shifter sleeve 716 until a shifting force is exerted through the selector lever 688. Unintentional movement of the sleeve 716 is thus prevented.

An engine disconnecting mechanism is provided to prevent engagement of the starting clutch B when the selector lever 688 is in the position shown in Fig. 3. The shifter sleeve 716 is slidably mounted in a stationary sleeve 727 having inlet and outlet ports 728 and 730 communicating with a branch conduit 731 extending from the engine driven pump A to the rear end of the cylinder 458 of the valve 454 controlling the starting clutch B. The shifter sleeve 716 is provided with an annular groove 734 adapted to interconnect the inlet and outlet ports 728 and 730 when the shifter lever 688 is in the engine disconnected position.

A stationary member is provided with spaced sections 741, 743 and 745 supporting the switch mechanism 724, the casing 744 housing the detent 740 and guiding the rear end of a rod 726 slidably mounted in the shifter sleeve 716. A spring 752 interposed between an abutment 754 of the stationary member and an extension 756 carried by the arm 330 is provided to yieldingly urge the arm 330 and rod 726 forwardly to maintain the coupler 304 in its inoperative position as illustrated in Figs. 1 and 3.

The rod 726 is provided with a slot 747 in one of its sides to receive the rounded actuating end portion 712 of the lever 708 for actuating the shifter sleeve 716 to shift the rod 726 rearwardly when the shifter sleeve is moved to the reverse position. Movement of the selector lever 688 shifts the sleeve 716 rearwardly to engage the detent 740 with the conical indentation 750. The initial movement of the shifter sleeve 716 moves the selector gear 238 through the shifter fork 250 to disengage the internal teeth 236 from the forwardly driving dental teeth 234 of the gear 218, and further movement engages the reverse gear 242 with the idler gear 244. When the actuating end portion 712 of the lever 708 contacts the rear end 749 of the slot 747 of the rod 726, the rod moves rearwardly to move the arm 330 to engage the synchronizer cone 324 with the conical surface 320 of the member 262 to synchronize the speeds of the members and thereafter shifts the coupler 304 into engagement with the dental gear 313 to permit power to be transmitted around the one-way clutch 264 to rotate the final driven shaft 272 in the reverse direction.

The laws of certain states require that the braking effort of the engine be available in an underdriven gear ratio for use as a brake when descending some hills. A positive intermediate speed drive control is provided to render the direct drive clutch D inoperative, and to direct the drive through the intermediate speed clutch C. A positive intermediate speed control member 760 positioned on the instrument panel 762 of the vehicle is shown connected through a flexible connection 764 with a link 766 connected to an arm 768 of a lever 770 pivoted at 772 and provided with an arm 774 to move the rod 726 rearwardly. The arm 330 at the rear end of the rod 726 is moved to shift the valve plunger 530 of the valve mechanism 528 to align a reduced portion 776 of the valve plunger 530 with the conduits 520 and 534 to momentarily interrupt and then continue the flow of fluid from the intermediate speed selector valve to the intermediate speed clutch C. The valve plunger 530 is provided with a direct drive cutoff portion 778 adapted to interrupt the flow of fluid through the conduit 560 from the direct drive control valve to the direct drive clutch D, the portion 566 of reduced diameter of the valve plunger 530 moving axially to interconnect the conduit 568 with a vent passage 780 to disengage the direct drive clutch D and interrupt the direct drive of the vehicle.

It will of course be understood that the various parts of the valve mechanism F and other elements such as the governor E and the valve associated with the starting clutch B can be made of a number of separate parts suitably secured together in any desired manner.

The operation of the device as a whole is as follows: In order to start the engine, the selector lever 688 must be in the engine disconnected or starting position illustrated in Fig. 3 to engage the cam 720 carried by the shifter sleeve 716 with the cam 722 to complete a circuit through the starting motor of the engine when the starting switch is closed. The engine is then started in the usual manner by actuating the starter switch (not shown). When the engine is running with the selector lever 688 in the engine disconnected position the vehicle cannot be driven because pressure developed by the pump A flows through the branch conduit 731 and annular groove 734 formed in the shifter sleeve 716 aligned with the inlet and outlet ports 728 and 730 to the rear end of the starting valve 454 to prevent the piston 456 from moving to permit engagement of the starting clutch B in the event that the accelerator 632 is depressed.

With this improved control mechanism it is unnecessary to use a synchronizer with the forward and reverse selector gear 238. The engine disconnected or starting position of the selector lever 688 illustrated in Fig. 3 is not a true neutral because the teeth 236 of the selector gear 238 are partially engaged with the dental teeth 234 of the gear 218 as illustrated in Fig. 1.

Forward drive is effected by moving the manual selector lever 688 to the forward drive position thereby moving the shifter sleeve 716 from the position illustrated in Figure 3 to the forward drive position whereupon the detent 740 engages the conical indentation 746; the selector gear 238 is moved by the shifter fork 250 to fully engage its teeth 236 with the dental teeth 234, and the sleeve 716 cuts off the flow of fluid through the conduit 731 from the engine driven pump A to the rear of the starting valve 454 and vents the lower end of conduit 731 as indicated. Then the vehicle may be started in low speed ratio by depressing the accelerator pedal 632. The throttle 668 in the induction passage 670 of the carburetor is moved in the opening direction to accelerate the engine, and the lever 624 actuating the plunger 412 of the master valve F is moved from the position 682 toward the throttle open position illustrated at 684. Movement of the valve plunger 412 in the forward direction is proportional to throttle opening movement of the accelerator pedal 632, and aligns the inlet port 442 of the plunger 412 with the inlet port 438 of the clutch modulating valve 416 communicating through the axially extending groove 432 with the conduits 402 and 400 connected with the pump A driven by the engine. Fluid then flows through the axially extending bore 444 of the valve plunger 412 and radially extending outlet port 446 in the plunger 412 to the fluid pressure balancing chamber 448 formed between the abutment 408 and the rear end of the clutch modulating valve 416.

As the pressure in the chamber 448 increases the valve 416 moves forwardly in the cylinder against the resistance of the low and high rate springs 418 and 420 to reduce or cut off communication between the inlet ports 430 and 442. The chamber 448 communicates through the conduit 450 and the left hand end of conduit 452 with the forward end of the cylinder 453 of the starting valve 454 forwardly of the piston 456. The right hand end of the conduit 452 communicates with the forward end 504 of the intermediate speed control cylinder 506.

When the abutment 426 of the trapped spring 420 is contacted by the piston 416, a definite increase in reaction (resistance) is encountered which results in a definite pressure rise in chamber 448 without further movement of the valve 416 to close the opening formed between 430 and 432 until the pressure in 448 attains an increased load capable of further compressing spring 420. The pressure in conduit 450, 452 and the left end of chamber 454 likewise sharply rises from a value insufficient to move valve 456 to the right to a value definitely sufficient to cause movement of the valve thereby causing flow under the increased pressure through conduit 464 to chamber 54 to engage the starting clutch B.

Rotation of the impeller 70 energizes fluid and directs it to the turbine 72. As the vehicle is starting, at which time high torque multiplication is necessary, the fluid issuing from the turbine 72 is guided by the reaction member 74 and is redirected to the impeller 70 with a suitable angular component that torque is multiplied in the fluid unit and power is transmitted at reduced speed, the fluid reaction exerted on the reaction member vanes 196 being transmitted through the one-way clutch 172 and sleeve 178 to the cover plate 66 secured to the radially extending wall 64 of the front section 10 of the transmission casing.

Energy absorbed by the turbine 72 is transmitted through the hub 110, forward driving shaft 118, clutch driving sleeve 122, driving shaft 120, gear 128 to drive the gear 204 mounted through the one-way clutch 210 on the layshaft sleeve 202. Rotation of the layshaft sleeve 202 is transmitted through the gears 216 and 218, coupler 238, splines 240, driving sleeve 220, one-way clutch 264, radially extending flange 266, clutch cylinder 268, and driving flange 270 to rotate the final driven shaft 272 to transmit power with high torque multiplication and at reduced speed.

As the vehicle accelerates to such a point that decreased torque multiplication is sufficient to transmit the load to which the engine is subjected, the fluid issuing from the turbine 72 changes its direction angularly to such an extent that no backwardly directed force is exerted on the reaction member vanes 196, but rather a forwardly directed force is exerted thereon. The guide wheel member 74 then rotates forwardly in the fluid circuit because of the one-way clutch 172 whereupon the fluid unit ceases operating as a torque converter and functions as a fluid clutch. The power transmitted by the fluid unit when operating as a fluid clutch is directed to the tailshaft 272 through the same gear train as discussed above. The intermediate speed drive is thus effected in such a manner that no torque multiplication is provided by the fluid unit, and torque is multiplied only by the gear unit to provide the desired intermediate speed drive.

As the valve plunger 412 of the master control mechanism F moves forwardly in response to movement of the accelerator pedal 632 in the speed increasing direction, the communication between the inlet conduit 402 and the pressure balancing chamber 448 of the clutch modulating control mechanism is increased. Increased pressure in the pressure balancing chamber 448 urges the clutch modulating valve 416 to move forwardly against the resistance of springs 418 and 420. The valve 416 therefore moves axially with the valve plunger 412 in proportion to speed increasing movement of the accelerator pedal 632.

It will be noted that the clutch modulating valve 416 floats freely in the cylinder 406, and that its position at any particular time is determined by the balance of the forces exerted in the pressure balancing chamber 448 tending to move the valve to close communication between the inlet ports 430 and 442, and the forces exerted by the low and high rate springs 418 and 420 urging the valve in the direction to open communication between the inlet ports 430 and 442, the relative position of the valve 416 being varied in proportion to the position of the accelerator pedal through the movement of the valve plunger 412 in the cylinder 406.

If the accelerator pedal 632 is opened to a relatively small extent, the overlapping of the inlet ports 430 and 442 will be relatively short to admit fluid to the pressure balancing chamber 448 at a relatively slow rate whereupon the movement of the clutch modulating valve 416 will be relatively small and the engagement of the starting clutch B will be correspondingly slow to provide a slow smooth start. If the accelerator 632 is opened to a greater extent the overlapping of the inlet ports 430 and 442 will be correspondingly greater to admit fluid to the pressure balancing chamber 448 at a more rapid rate whereupon the clutch modulating valve 416 will move to a greater extent and the engagement of the starting clutch B will be correspondingly rapid.

The engagement of the starting clutch B is thus correlated to vary in proportion to movement of the accelerator pedal 632, small opening movement of the accelerator pedal producing relatively slow clutch engagement, and greater opening movement of the accelerator pedal 632 producing more rapid engagement.

The governor E driven by the final driven shaft 272 through the gears 338 and 348 is operated when the vehicle starts to move. Rotation of the shaft 346 drives the rotatable member 578 carrying the pump vanes to develop substantially constant fluid pressure in the outlet passage 586 communicating through the branch conduit 596 and port 598 with the cross bore 602 communicating through the longitudinal bore 606 with the pressure balancing chamber 608. The position of the plunger 604 in the cylinder formed in the shaft 346 is controlled by the spring 614 influenced by the position of the axially movable plunger 616 actuated by the centrifugal weights 618. The centrifugal weights 618 exert an upwardly directed force on the movable plunger 604 through the spring 614 tending to align the cross bore 602 and the port 598 to admit more fluid from the branch conduit 596 communicating with the outlet of the pump. As fluid flows into the pressure balancing chamber 608 the pressure of the fluid exerted on the top of the movable plunger 604 exerts a downwardly directed force tending to move the plunger to cut off communication between the port 598 and the cross bore 602. The conduit 576 communicating with the pressure balancing chamber 608 is thus subjected to pressure proportional to the speed of the vehicle. The linkage, springs and the area of the pistons are correlated to provide a substantially one to one ratio of pressure to speed up to say fifty-three miles per hour, and to provide a ratio substantially equal to the square of the speed at higher speeds. It will be understood that any desired ratio of pressure and speed may be obtained, within limits, to provide the desired shift pattern.

The pressure in the fluid pressure balancing chamber 608 is transmitted through the conduit 576 and branch conduit 572 to the cylinder 506 of the intermediate speed control mechanism, and is exerted on the rear end 512 of the compound piston 508. When the pressure exerted on the piston 508 is sufficient to move it forwardly, the rear end of the forward section 510 of the piston uncovers conduit 518 to admit fluid from the clutch modulating pressure balancing chamber 448 through the conduits 450 and 452. This fluid flows through the section 514 of reduced diameter of the piston 508 and conduit 520 communicating with the conduit 534 through the reduced section 532 of the valve plunger 530, and through the conduit 536 to the intermediate speed clutch C.

When the intermediate speed compound piston 508 is thus moved forwardly to such a point that the front section 510 of the piston 508 uncovers the conduit 518, pressure from the chamber 448 is exerted on the differential of area between the front section 510 and the reduced section 514 to urge the piston 508 forwardly to prevent the clutch C from disengaging until the force exerted on the piston by the pressure from chamber 492 overcomes the forces urging the piston forwardly.

The position of the clutch selecting valve 466 in the cylinder 406 of the valve mechanism F and the pressure exerted in the chamber 492 is determined by the position of the valve plunger 412 which moves proportional to throttle opening movement of the accelerator pedal. Fluid under pressure from the engine driven pump A is directed through the conduits 400 and 404, through the inlet ports 472 and 484 in the valve 466 and plunger 412, bore 486 and outlet port 490 to the pressure balancing chamber 492. As the plunger 412 moves forwardly in response to throttle opening movement of the accelerator 632 the communication between the inlet ports 484 of the plunger and 472 of the piston 416 is increased to admit more fluid to the chamber 492 thereby increasing the pressure therein. This increased pressure in the chamber 492 moves the valve 466 forwardly against the resistance of spring 470 thereby reducing communication between the inlet ports 472 and 484. Since the front end 504 of the intermediate speed control cylinder 506 communicates with the chamber 492 it will be apparent that the piston 508 is urged rearwardly to disengage the intermediate speed clutch C by a force that is proportional to throttle opening movement of the accelerator pedal 632. It will thus be noted that to engage the intermediate speed clutch C the pressure exerted on the rear end 512 of the piston 508 by the governor E must overcome the force exerted on the front end 510 of the piston from the chamber 492.

This control mechanism therefore functions in such a manner that with small throttle opening movement of the accelerator pedal, the intermediate speed clutch C is engaged at a relatively slow vehicle speed of say ten miles per hour, but with increased throttle opening movement of the accelerator pedal 632, the engagement of the intermediate speed clutch C is delayed until a higher vehicle speed of say twenty-eight miles per hour has been attained.

When the intermediate speed clutch C is engaged the fluid unit continues to operate as a fluid clutch transmitting power to the driving shaft 118 which drives the sleeve 122, and power is transmitted through the clutch driving flange 130, clutch cylinder 132, clutch disks 134, 138 and member 142 to drive the shaft 146 having the gear 150 meshing with the gear 206 splined on the layshaft sleeve 202. The layshaft sleeve 202 is thus rotated at a higher speed than when the drive is transmitted through the gear 128. The low speed drive through the gear 128 carried by the driving shaft 120 is rendered inoperative because of the one-way clutch 210 interposed between the gear 204 and the layshaft sleeve 202. The layshaft sleeve 202 will therefore overrun the gear 204 and power will be transmitted through the gears 216, 218, coupler 230, sleeve 220, one-way clutch 264, clutch driving member 262, driving flange 266, clutch cylinder 268, and driving flange 270 to the final driven shaft 272.

Attention is called to the fact that the intermediate speed clutch C is engaged by fluid pressure from the engine driven pump A through the clutch modulating pressure balancing chamber 448 controlled by the clutch modulating valve 416 associated with the valve plunger 412 to develop fluid pressure proportionate to the position of the accelerator pedal 632. The rate of engagement of the intermediate speed clutch C is thus controlled in the same manner as the starting clutch B to provide slow clutch engagement upon relatively small throttle opening movement, and more rapid clutch engagement if the accelerator is moved further in the throttle opening direction.

As the speed of the vehicle increases to such a point that the load may be transmitted in direct drive with the intermediate speed piston 508 urged forwardly to engage the intermediate speed clutch C, the speed controlled pressure developed by the governor E driven by the final driven shaft 272 is transmitted through the conduit 576 and branch conduit 574 to move the compound piston 548 forwardly in its cylinder by pressure exerted against the rear end 552 of the piston. As the piston 548 moves forwardly, the front section 550 of the piston uncovers the conduit 558. Fluid from the clutch modulating fluid pressure balancing chamber 448 then flows through the intermediate speed cylinder 504 into the direct drive cylinder behind the front section 550 of the piston 548 and through the conduit 560 communicating by way of the section 566 of reduced diameter of the valve plunger 530 in the cylinder 526 to direct fluid under pressure through the conduit 568 and passages 570 to engage the direct drive clutch D. The speed controlled pressure developed by the governor E to move the compound piston 548 in the cylinder 546 to engage the direct drive clutch is opposed by the fluid pressure in the clutch selector fluid pressure balancing chamber 492.

The engagement of the direct drive clutch is thus also influenced by the position of the accelerator pedal 632, and the speed of the vehicle or of the final driven shaft 272. With small throttle opening position of the accelerator pedal the direct drive clutch will be engaged at relatively slow vehicle speed, say fifteen miles per hour. With large throttle opening movement of the accelerator pedal the direct drive clutch will be engaged at a higher vehicle speed of say fifty five miles per hour.

As the vehicle approaches the aforesaid fifty three miles per hour, the upstanding projection 617 carried by the centrifugally actuated plunger 616 engages the valve plunger 604 directly and moves it upwardly with a force proportional to the square of the speed. This action results in an increase in pressure in the chamber proportional to the square of the speed above the aforementioned fifty three miles per hour because the spring 614 is no longer able to modify the mechanical advantage of the governor weight linkage.

The fluid pressure to engage the direct drive clutch D is supplied by the engine driven pump A through the clutch modulating pressure balancing chamber 448 controlled by the position of the valve plunger 412 actuated by the accelerator pedal 632. The rate of engagement of the direct drive clutch is therefore controlled by the position of the accelerator pedal to provide slow engagement with relatively small throttle opening position, and to provide more rapid engagement with greater throttle opening position of the accelerator pedal.

When the direct drive clutch D is engaged the drive flows from the driving member 20 through the hub 22, central drive shaft 18, and clutch D to the final driven shaft 272 without passing through any gear or fluid units. A high efficiency drive is thus provided for high speed or direct drive operation.

It will be noted that when the direct drive clutch D is engaged the valve plunger 530 of the valve mechanism 528 remains in the position illustrated in Figure 3, whereupon the starting and intermediate speed clutches B and C remain engaged. The fluid unit consisting of the impeller, turbine and reaction members 70, 72 and 74 respectively continues to rotate, but virtually no power losses are encountered because the shaft 118 driven by the turbine 72 is not subjected to any load.

When greater acceleration is required than is available while the transmission is operating in direct drive, such for example as to pass another vehicle, the accelerator pedal 632 may be depressed beyond the full throttle position to move the valve plunger 412 from the position 684 to the kickdown position illustrated at 686.

When the accelerator pedal is moved to the full throttle position, the valve plunger 412 moves from the position 682 to the position 684 and the clutch selector valve 466 is positioned adjacent the kickdown abutment or snap ring 494. As the accelerator pedal 632 is moved beyond the full throttle position to the kickdown position, the valve plunger 412 moves forwardly to the position 686. The valve 466 is restrained from moving forwardly with the plunger 412 by the kickdown spring 498 whereupon communication between the inlet ports 472 and 484 in the valve 466 and plunger 412 is increased. An increased quantity of fluid from the engine driven pump A flows into the chamber 492 to urge the clutch selector valve 466 forwardly against the resistance of spring 470, thereby immediately increasing the pressure in the pressure balancing chamber 492. This increased pressure is exerted on the forward ends 510 and 550 of the intermediate and direct drive control pistons 508 and 548. The area of the forward end 550 of the direct drive control piston 548 is so calibrated that the increased pressure in the chamber 492 will move the piston 548 rearwardly to interconnect the conduit 560 with the vent passage 564 thereby rendering the direct drive clutch D inoperative. The rear section 512 of the intermediate speed control piston 508 is of larger diameter than the rear section 552 of the direct drive control piston 548 and is therefore subjected to greater forward thrust from the governor E. Assuming that the increased pressure developed in the chamber 492 by the kickdown action is sufficient to move the direct drive control piston 548 rearwardly, but is not sufficient to move the intermediate speed control piston 508 rearwardly, the direct drive clutch D will be disengaged but the clutch C will remain engaged and will pick up the drive through the one way clutch 264.

These controls are calibrated in such a manner that at predetermined high vehicle speeds when the torque developed by the engine would accelerate the vehicle as rapidly in direct drive as it would in the intermediate speed drive, the kickdown control is ineffective, and even though the accelerator pedal 632 is moved to the kickdown position the transmission will remain in direct drive. This is accomplished by so calibrating the tension of the kickdown spring 498 with reference to the areas of the front and rear ends 550 and 552 of the compound direct drive piston 548 that at predetermined high vehicle speed the combined forces urging the piston 548 forwardly will be greater than the force urging it rearwardly.

It is possible to kickdown from the intermediate speed ratio thereby rendering the intermediate speed clutch C inoperative in the event that increased acceleration is desired when operating at relatively low vehicle speed with the intermediate clutch C engaged. Kickdown from intermediate to low speed ratio drive is accomplished in the same manner as the kickdown from direct drive to intermediate speed. If the increased pressure exerted on the front end 510 of the intermediate speed piston 508 is sufficient to overcome the forces exerted in the opposite direction, the piston 508 will be shifted rearwardly to cut off the supply of fluid from the chamber 448 and open the vent passage 524, thus rendering the intermediate speed clutch C inoperative. If the vehicle is travelling at sufficient speed that approximately equal acceleration would be available in the intermediate speed ratio, as in the low second speed ratio, the increased pressure urging the piston rearwardly will not be sufficient to overcome the forces urging the piston in the opposite direction and the intermediate speed clutch C will remain engaged.

The accelerator pedal 632 may be successively actuated to kickdown from direct to intermediate speed drive by disengaging the direct drive clutch D, and at slower vehicle speed to kickdown from the intermediate to the low speed ratio drive by disengaging the intermediate speed clutch C. At slow vehicle speeds both the direct and intermediate speed clutches D and C may be rendered inoperative by movement of the accelerator pedal to the kickdown position if the increased pressure urging the valves 508 and 548 rearwardly is sufficient to overcome the forces in the opposite direction.

When the operator desires to utilize the braking effort of the engine, such for example as when going down a hill, he pulls out the positive intermediate speed control member 760 on the instrument panel 762 thereby rocking the lever 770 to move the rod 726 and arm 330 rearwardly against the resistance of spring 752 to move the valve plunger 530 rearwardly in cylinder 526. The slot 747 formed in the side of the rod 726 permits the rod to move rearwardly relative to the actuating portion 712 of the lever 708 which moves the shifter sleeve 716. The direct drive cutoff portion 778 of the plunger 530 cuts off communication between conduits 560 and 568, and the section 566 of reduced diameter of the plunger 530 connects conduit 568 with the vent passage 780 thereby rendering the direct drive clutch D inoperative.

It will be noted that as the plunger 530 moves rearwardly the communication between the conduits 520 and 534 for supplying fluid to the intermediate speed clutch C are interrupted by the section of the plunger of large diameter between the reduced sections 532 and 776, and that the intermediate speed clutch C is disengaged when the section of reduced diameter 532 of the plunger 530 interconnects the conduit 534 with the vent 535. When the plunger 530 moves axially to such a point that the section 776 of reduced diameter overlies the ends of the conduits 520 and 534, the intermediate speed clutch C is again engaged to transmit the drive.

When the flow of fluid in the conduit 534 is interrupted by rearward movement of the plunger 530 and the intermediate speed clutch C is disengaged through the vent 535, the synchronizer brake 324 actuated by rearward movement of the arm 330 synchronizes the speeds of the coupler 304 and the clutch driving member 262 to permit the coupler to shift rearwardly by continued movement of the arm 330 to engage the dental teeth 313 to provide a two-way drive around the one-way clutch 264.

To interrupt the positive intermediate speed drive the operator releases the catch holding the control member 760, and returns it to the inoperative position illustrated in Fig. 3. The spring 752 moves the arm 330 and rod 726 to the direct drive position whereupon the coupler 304 disengages the dental teeth 313 and the plunger 530 interconnects the conduits 560 and 568 to engage the direct drive clutch D, assuming that the vehicle speed is such that the intermediate and direct drive selector valves 508 and 548 are in the direct drive positions.

In order to engage the reverse drive gearing it is necessary that the selector lever 688 be positioned in or pass through the engine disconnected or starting position illustrated in Fig. 3. The annular groove 734 in the shifter sleeve 716 is then aligned with the inlet and outlet ports 728 and 730 of the branch conduit 731 to direct fluid under pressure from the engine driven pump A to the rear of the starting valve 454 to render the starting clutch B inoperative. Movement of the selector lever 688 to the reverse drive position moves the shifter sleeve 716 rearwardly to cut off the flow of fluid through the branch conduit 731 from pump A and vent conduit 731 from valve 454 to render the starting clutch B operable, and moves the fork 250 to shift the selector gear 238 axially to disengage its teeth 236 from the dental teeth 234. Due to the action of the starting valve 454 in preventing the starting clutch B from becoming engaged, the gears are not rotating, and the gear 242 of the selector gear 238 slides into engagement with the reverse idler gear 244 immediately after release of the dental teeth 236 and 224 as the selector lever 688 is moved to the reverse position.

As the selector lever 688 is moved toward the reverse drive position the actuating end 712 of the lever 708 engages the rear end of the slot 747 in the rod 726 and moves the rod and the arm 330 rearwardly. Movement of the arm 330 shifts the coupler 304 rearwardly to engage the synchronizer cone type brake 320 with the conical surface 324 to synchronize the speeds of the members 310 and 262. When synchronization has been obtained the arm 330 shifts the coupler 304 to engage coupler 304 with the dental teeth 313 of the clutch driving member 262 providing the necessary reverse driving connection.

The operation of the transmission forwardly of the selector gear 238 is the same in the reverse drive as in the forward drive, except that the rear pump may be designed to be inoperable due to being driven in the reverse direction eliminating pressure in the conduit 576 and preventing shifting into a higher gear ratio in reverse which may be considered unsafe. The fluid unit and the layshaft driving gears rotate in the forward direction, and the final driven shaft 272 is driven in the reverse direction.

The drive through the reverse gear train is initiated by actuation of the accelerator pedal 632 in the same manner as the forward drive to engage the starting clutch B to transmit power through the fluid unit acting as a torque converter. When the speed increases to such a point that the fluid discharged from the turbine does not exert a backwardly directed force on the guide wheel vanes 196, the fluid unit operates as a fluid clutch to transmit power at a high speed ratio, the reaction member 74 rotating forwardly in the fluid circuit on the one way clutch 172.

To start the engine by pushing the vehicle the manual selector lever 688 is moved to the forward drive position, the ignition switch is turned on, the accelerator pedal 632 is depressed slightly and the vehicle is pushed. Rotation of the final driven shaft 272 operates the pump 577 of the governor E to develop fluid pressure and transmit it through the conduits 586 and 588. When the pressure developed in the conduit 588 is sufficient to actuate the check valve 590, fluid flows from the conduit 588 into the conduit 400 thereby supplying fluid under pressure to the clutch modulating and clutch selector pressure balancing chambers 448 and 492 to successively engage the starting, intermediate and direct drive clutches B, C and D respectively. The one-way clutch 264 between the layshaft driven gears and the final driven shaft 272 prevents the starting and intermediate speed clutches B and C from transmitting the drive to the engine. When the vehicle is pushed at a sufficiently high speed that the direct drive clutch D is engaged, the final driven shaft 272 is connected through the clutch D and central drive shaft 18 with the driving member or crankshaft 20 of the engine whereupon the engine is driven in the direct drive ratio to start the engine. A check valve 401 is interposed in the conduit 400 between the engine driven pump A and the conduit 402 to prevent fluid from the pump 577 from entering the pump A. The rear pump takes the place of the front pump to supply oil pressure to conduits 402 and 404, and the controls function exactly the same as for normal driving at "minimum" throttle.

When the engine has started, pressure developed by the front pump A will be transmitted through the conduit 400 to open the check valves 401 and close check valve 590, replacing the rear pump as an oil pressure source.

It will be noted that my improved transmission operates to automatically engage the starting clutch B when the accelerator pedal 632 is actuated, and that the rate of engagement of all of the clutches B, C and D is controlled by the extent of movement of the accelerator pedal. The drive of the vehicle is initiated through a fluid medium to insure a smooth start. The drives in the higher speed ratios are initiated automatically by the successive engagement of clutches under conditions whereby it is unnecessary to simultaneously release and engage clutch or brake members. A smooth drive from a high torque low speed ratio starting drive to a direct mechanical drive is thus provided automatically under the control of the accelerator pedal.

Figure 5:
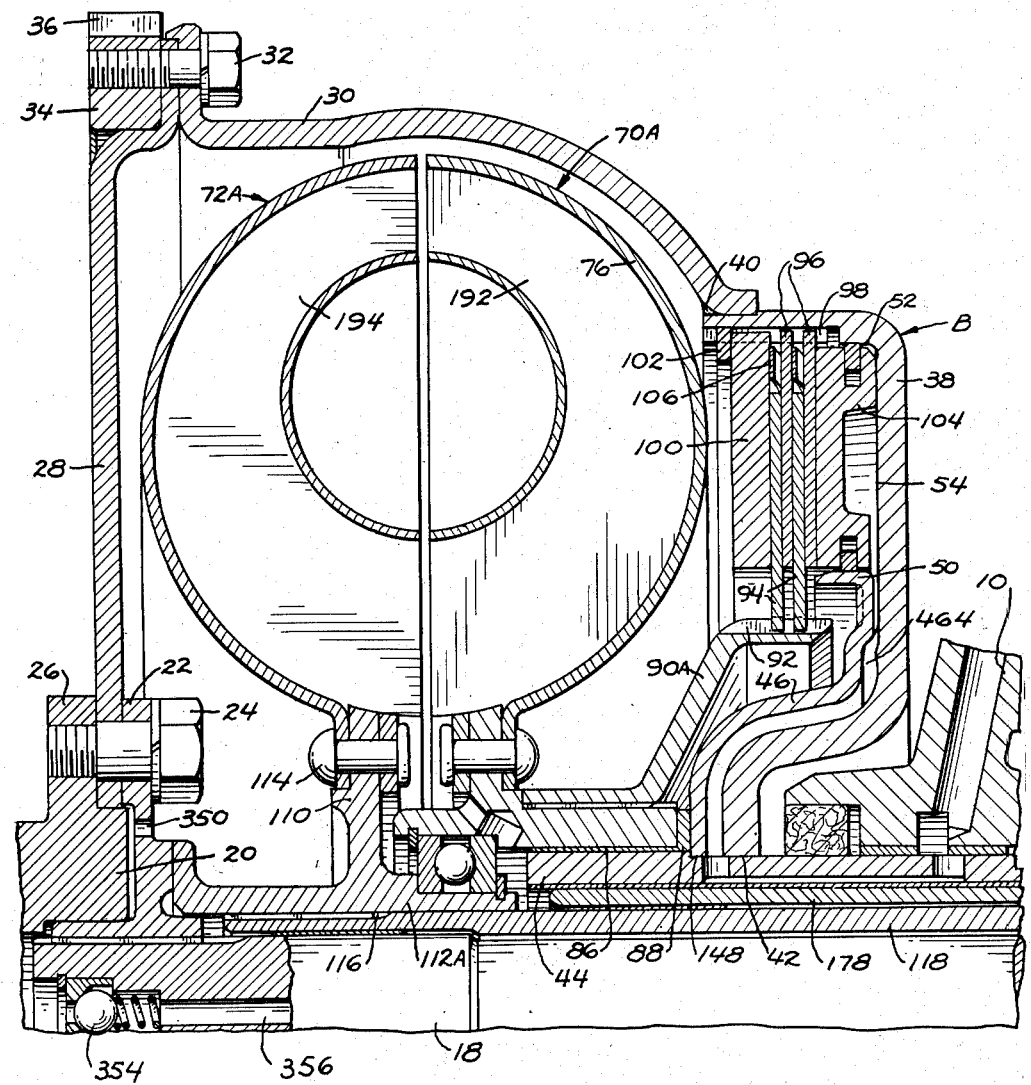
Fig. 5 is a view similar to Fig. 2 illustrating a modified form of the invention.

Fig. 5 discloses an embodiment of the invention wherein a fluid clutch is substituted for the torque converter illustrated in Figs. 1 and 2, and the same reference numerals have been used on corresponding parts as in Figs. 1 and 2.

The impeller 70A is driven through the flange 90A by the starting clutch B, and delivers energized fluid to the turbine 72A connected through the hub member 112 to the driving shaft 118. It will be noted that the outlet from the turbine 72A discharges directly into the inlet to the impeller 70A rather than through a reaction member as in the embodiment of Figs. 1 and 2.

When the fluid clutch of Fig. 5 is employed with the gear mechanism of Fig. 1, and any suitable controls such for example as those illustrated in Fig. 3 are employed, a multispeed transmission is provided. The low speed drive is initiated by engaging the starting clutch B to drive the impeller 70A to energize fluid and direct it to the turbine 72A. Energy absorbed by the turbine is transmitted through the driving shafts 118 and 120 of Fig. 1 to the gear 128 connected through the gear 204 and the one-way clutch 210 to the layshaft sleeve 202 operably connected to the final driven shaft 272 as indicated in connection with Fig. 1.

The engagement of the intermediate or second speed drive of the fluid clutch embodiment illustrated in Fig. 5 corresponds with the intermediate speed drive of the torque converter embodiment of Figs. 1 and 2. The intermediate speed drive is effected by engaging the clutch C as previously discussed whereupon power flows through the clutch C, shaft 146 and gear 150 to drive the layshaft sleeve 202 faster to provide the intermediate speed.

The direct drive of the fluid clutch embodiment of Fig. 5 corresponds with the direct drive of Figs. 1 and 2. The direct drive is provided by engaging the direct drive clutch D whereupon power flows from the driving member 20 through the central shaft 18 and clutch D to the final driven shaft 272.

It will be understood that various forms of the invention other than those described above may be used without departing from the spirit or scope of the invention.

I claim:

1. A control mechanism for a multi-speed ratio transmission having a movable member and a source of fluid pressure, a cylinder and piston defining a pressure balancing chamber, means movable in response to movement of said movable member to increase communication between the pressure balancing chamber and the source of fluid pressure, the piston being moved in response to an increase of pressure in the pressure balancing chamber to decrease communication between the pressure balancing chamber and the source of fluid pressure, and connecting means including a plurality of valves between the pressure balancing chamber and the speed ratio mechanism of the transmission.

2. In a transmission for an accelerator pedal controlled vehicle having driving and driven shafts, fluid pressure pumps driven by the driving and driven shafts respectively, a plurality of successively engaging friction clutches interposed between said shafts to provide successively higher speed ratio drives, clutch selector valves controlling the operation of certain of said clutches, means to subject the clutch selector valves to speed controlled fluid pressure developed by the driven shaft pump to urge said valves toward clutch engaging positions, and means to subject the selector valves to accelerator pedal position controlled fluid pressure developed by the driving shaft pump to oppose movement of said valves toward clutch engaging positions.

3. In a transmission for an accelerator pedal controlled vehicle having driving and final driven shafts, a pump driven by the driving shaft, a clutch interposed between said shafts, a control mechanism having relatively movable members defining a pressure balancing chamber, means movable in response to speed increasing movement of the accelerator pedal to increase communication between the pressure balancing chamber and said pump, one of the movable members of the control mechanism moving in response to an increase of pressure in the pressure balancing chamber to decrease communication between the pressure balancing chamber and said pump, and connecting means including a valve between the pressure balancing chamber and said clutch.

4. An accelerator pedal actuated clutch modulating control mechanism for a transmission having a source of fluid pressure comprising a cylinder and a movable member defining a pressure balancing chamber, means movable in response to speed increasing movement of the accelerator pedal to increase communication between the pressure balancing chamber and the source of fluid pressure, said member being moved in response to an increase of pressure in the pressure balancing chamber to decrease communication between the pressure balancing chamber and the source of fluid pressure, and connecting means including a valve between the pressure balancing chamber and a clutch to be actuated.

5. A clutch modulating control mechanism for varying the rate of engagement of a plurality of friction clutches of a transmission for a vehicle having a source of fluid pressure, comprising a cylinder having relatively movable piston and valve members defining a clutch modulating pressure balancing chamber, the piston and valve members having cooperating fluid inlet passages to admit fluid from said source to said chamber, yielding means to align said ports to admit an increased quantity of fluid to said chamber, the fluid pressure exerted in said chamber urging said members to move to interrupt communication of the inlet passages, and connecting means, a plurality of valves between said chamber and the clutches to be engaged.

6. A clutch selector control mechanism for a transmission having driving and driven members including a source of fluid pressure and a plurality of successively engaging hydraulically actuated friction clutches to provide progressively higher speed ratio drives, comprising a cylinder having a valve member defining a pressure balancing chamber, an accelerator pedal, a plunger movable relative to the valve member, connecting means between the plunger and the accelerator pedal, yielding means urging the valve toward one end of the cylinder, the valve member and plunger having cooperating inlet ports adapted to align to admit fluid under pressure, to the pressure balancing chamber from said source, a plurality of spaced clutch selector valves communicating with the pressure balancing chamber, a governor including a pump driven by the driven member of the transmission, a speed responsive mechanism controlling the pressure supplied by said pump, and means to subject the ends of the clutch selector valves remote from the pressure balancing chamber to speed governed fluid pressure to urge said valves toward clutch engaging positions, the pressure from the pressure balancing chamber urging said valves to delay successive engagement of higher speed ratio clutches in proportion to the position of said plunger.

7. In a transmission for an accelerator pedal controlled vehicle having driving and driven shafts, fluid pressure pumps driven by the driving and driven shafts respectively, a low speed ratio clutch and a plurality of successively operable higher speed ratio clutches interposed between said shafts, means to engage the low speed ratio clutch by driving shaft pump pressure proportionate to speed increasing position of the accelerator pedal, clutch selector valves controlling the engagement of said higher speed ratio clutches, means to subject the clutch selector valves to speed controlled fluid pressure developed by the driven shaft pump to urge said valves toward clutch engaging positions, and means to subject spaced portions of the selector valves to driving shaft pump pressure modified by accelerator pedal position to oppose movement of said valves toward clutch engaging positions to delay successive engagement of the higher speed ratio clutches in proportion to speed increasing position of the accelerator pedal.

8. A master speed and torque responsive control mechanism for successively engaging a plurality of friction clutches of a transmission for an accelerator pedal controlled vehicle comprising a driving member, a fluid pump driven thereby, a driven member, a fluid pump driven thereby, a speed responsive governor controlling the flow of fluid therefrom, comprising a cylinder having a clutch selector valve chamber, a plunger slidably mounted in said chamber, connecting means between the plunger and the accelerator pedal, a clutch selector valve slidably mounted on said plunger in said chamber to define a pressure balancing chamber, the valve and plunger having spaced fluid inlet passages adapted to align to admit fluid from the driving member pump to said pressure balancing chamber, yielding means urging said valve to move relative to the plunger to align the inlet passages, the fluid pressure exerted in said chamber urging the valve to move relative to the plunger to reduce communication between the inlet passages, a plurality of clutch selector valves each having one of its ends communicating with said chamber to delay successive engagement of said clutches in proportion to accelerator pedal position, and means to subject the opposite ends of said valves to driven shaft speed governed pressure urging said valves to successively engage said clutches.

9. In a transmission for an accelerator pedal controlled vehicle having driving and driven shafts, fluid pumps driven by the driving and driven shafts, a plurality of successively engaging clutches to provide different speed ratio drives between the driving and driven shafts, a clutch selector valve movable between non-engaging and engaging positions controlling engagement of each of said clutches, a control mechanism comprising movable members defining a pressure balancing chamber interposed between the driving shaft pump and the clutch selector valves to urge said valves toward the non-engaging position, means movable in response to speed increasing movement of the accelerator pedal to increase the pressure in said chamber, one of the movable members of the control mechanism moving in response to an increase of pressure in said chamber to limit the pressure therein in proportion to the position of the accelerator pedal, a governor driven by the driven shaft and comprising relatively movable members defining a pressure balancing chamber communicating with the clutch selector valves to urge said valves toward the engaging position, and means movable in response to an increase of the speed of rotation of the driven shaft to exert a force on the movable member urging it to increase communication between the pressure balancing chamber and the driven shaft pump, the movable member of the governor moving in response to an increase of pressure in said chamber to decrease communication between the pressure balancing chamber and the source of fluid pressure.

10. In a transmission for an accelerator pedal controlled vehicle, a driving shaft, a final driven shaft, a source of fluid pressure, a plurality of clutches interposed between the driving and the final driven shafts, fluid pressure actuated means to engage said clutches, selector means to successively engage said clutches, means to subject the selector means to fluid pressure proportionate to final driven shaft speed opposed by fluid pressure proportionate to speed increasing position of the accelerator pedal to successively engage said clutches and provide higher speed ratio drives in proportion to variations of vehicle speed and accelerator position, and means to modulate engagement of said clutches by supplying clutch engaging fluid pressure proportionate to speed increasing position of the accelerator pedal.

11. A transmission for an accelerator pedal controlled vehicle, comprising a driving shaft, a final driven shaft, a direct drive shaft secured to the driving shaft, a direct drive clutch interposed between the direct drive shaft and the final driven shaft, a source of fluid pressure, a plurality of geared speed ratio clutches interposed between the driving and the final driven shafts, fluid pressure actuated means to successively engage all of said clutches, selector means controlling the pressure actuated means, means to subject the selector means to fluid pressure proportionate to the speed of the final driven shaft opposed by fluid pressure proportionate to speed increasing position of the accelerator pedal to successively engage said geared speed and direct drive clutches in proportion to variations of vehicle speed and accelerator position, and means to modulate engagement of said clutches by providing clutch engaging pressure proportionate to speed increasing position of the accelerator pedal.

12. In a transmission for a vehicle having an accelerator pedal controlled engine, a driving member, a final driven member, a plurality of successively operable stepped gear ratio drives between the driving member and the final driven member and including a low ratio starting drive and a direct drive, one way driving means between the lower ratio drives and the final driven member, a plurality of successively operable clutches associated with said plurality of successively operable stepped gear ratio drives, a front pump driven by the driving member, a governor comprising a pump driven by the final driven member and a speed responsive member controlling the fluid pressure delivered by said pump, means to supply fluid under pressure from the front pump to actuate said clutches, a master control mechanism to vary the rate of engagement of the starting clutch in proportion to movement of the accelerator pedal, means to direct front pump pressure to engage the intermediate and direct drive clutches, valves controlling said intermediate and direct drive clutch engaging means, means to subject said valves to governed fluid pressure to urge the valves to engage the intermediate and direct drive clutches, and means to subject said valves to front pump pressure proportionate to the position of the accelerator pedal to delay engagement of the intermediate and direct drive clutches whereby the engagement of the intermediate and direct drive clutches will successively occur at progressively higher vehicle speeds proportionate to progressive speed increasing movement of the accelerator pedal.

13. A master speed and torque responsive control mechanism for successively actuating a plurality of friction clutches of a transmission for an accelerator pedal controlled vehicle having a driving member including a fluid pump driven thereby and a final driven member including a fluid pump driven thereby and a speed responsive governor controlling the flow of fluid therefrom comprising cylinders having clutch modulating and clutch selector valve chambers, accelerator pedal actuated valve plungers slidably mounted in said chambers, clutch modulating and clutch selector valves slidably mounted in said chambers on the accelerator pedal actuated valve plungers to define clutch modulating and clutch selector pressure balancing chambers, means including cooperating spaced fluid inlet passages in said valves and valve plungers adapted to align to admit fluid from the driving member pump to said pressure balancing chambers, yielding means urging each of said valves to move relative to the valve plunger to align said inlet ports to admit an increased quantity of fluid from the driving member pump to each of said pressure balancing chambers, the fluid pressure exerted in said pressure balancing chambers urging the valves to move relative to the valve plungers to interrupt communication of the inlet passages, connecting means between the clutch modulating pressure balancing chamber and the clutches to be engaged, clutch selector valve cylinders communicating with the clutch selector pressure balancing chamber, clutch selector valves in said cylinders subjected to fluid pressure from the clutch selector pressure balancing chamber to delay successive engagement of said clutches in proportion to accelerator pedal position, connecting means between opposite ends of said clutch selector cylinders and the fluid pump driven by the driven shaft whereby the clutch selector valves are subjected to speed governed pressure opposing pressure from the clutch selector pressure balancing chamber to successively urge said pistons to engage higher gear ratio drives.

14. In a transmission for an accelerator pedal controlled vehicle having driving and final driven shafts, fluid pumps driven by the driving and final driven shafts, a starting clutch and a plurality of successively operable higher speed ratio and direct drive clutches interposed between said shafts, a starting valve controlling the starting clutch, a clutch modulating control mechanism including a chamber having a movable member defining a pressure balancing chamber, means movable in response to speed increasing movement of the accelerator pedal to increase communication between the pressure balancing chamber and the driving shaft pump, the movable member of the control mechanism moving in response to an increase of pressure in the pressure balancing chamber to decrease communication between the pressure balancing chamber and the driving shaft pump, connecting means between the pressure balancing chamber and said starting valve, clutch selector valves controlling the engagement of said higher speed ratio and direct drive clutches, a clutch selector control mechanism including a chamber having a movable member defining a pressure balancing chamber communicating with one end of the clutch selector valves, means movable in respose to speed increasing movement of the accelerator pedal to increase communication between said pressure balancing chamber and the driving shaft pump, the movable member of the control mechanism moving in response to an increase of pressure in the pressure balancing chamber to decrease communication between said pressure balancing chamber and the driving shaft pump, a governor driven by the final driven shaft and comprising a chamber having a movable member defining a pressure balancing chamber communicating with the opposite end of the clutch selector valves, and means movable in response to an increase of the speed of rotation of the driven shaft to exert a force on the movable member urging it to increase communication between its pressure balancing chamber and the driven shaft pump, the movable member of the governor moving in response to an increase of pressure in its pressure balancing chamber to decrease communication between the pressure balancing chamber and the final driven shaft pump.

15. A master speed and torque responsive control mechanism for successively actuating a plurality of friction clutches of a transmission for an accelerator pedal controlled vehicle having a driving member including a fluid pump driven thereby and a final driven member including a fluid pump driven thereby and a speed responsive governor controlling the flow of fluid therefrom, comprising spaced clutch modulating and clutch selector valve chambers, an accelerator pedal actuated valve member slidably mounted in each of said chambers, clutch modulating and clutch selector valve members associated respectively with said accelerator pedal actuated valve members in said chambers to define clutch modulating and clutch selector fluid pressure balancing chambers, means including cooperating spaced fluid inlet passages in said valve members adapted to align to admit fluid from the driving member pump to said pressure balancing chambers, yielding means urging each of said valve members to move relative to its associated accelerator actuated valve member to align said inlet ports to admit an increased quantity of fluid to its associated pressure balancing chamber from the driving member pump, the fluid pressure exerted in said pressure balancing chambers urging each of said valve members to move relative to its associated accelerator pedal actuated valve member to reduce communication of the inlet passages, connecting means between the clutch modulating pressure balancing chamber and the clutches to be engaged, clutch selector valve cylinders communicating with the clutch selector pressure balancing chamber, clutch selector valves in said cylinders subjected to fluid pressure from the clutch selector pressure balancing chamber to oppose clutch engaging movement of the selector valves in proportion to speed increasing movement of the accelerator pedal, connecting means between opposite ends of said cylinders and the fluid pump driven by the driven member whereby the selector valves are subjected to speed controlled driven member pump pressure to urge said valves in the clutch engaging direction to successively engage higher gear ratio drives.

16. In a transmission for an accelerator pedal controlled vehicle having driving and final driven shafts, fluid pumps driven by the driving and final driven shafts, a starting clutch and a plurality of successively operable higher speed ratio clutches interposed between said shafts, clutch selector valves controlling the engagement of said higher speed ratio clutches, a clutch selector valve control mechanism having a chamber and a movable piston defining a pressure balancing chamber communicating with one end of the clutch selector valves, means movable in response to speed increasing movement of the accelerator pedal to increase communication between the pressure balancing chamber and the driving shaft pump, the movable piston of the control mechanism moving in response to an increase of pressure in the pressure balancing chamber to decrease communication between said chamber and the driving shaft pump, a governor driven by the final driven shaft and comprising a chamber having a movable member defining a pressure balancing chamber communicating with the opposite end of the clutch selector valves, means movable in response to an increase of the speed of rotation of the driven shaft to exert a force on the movable member urging it to increase communication between the pressure balancing chamber and the driven shaft pump, the movable member of the governor moving in response to an increase of pressure in the pressure balancing chamber to decrease communication between said chamber and the final driven shaft pump, and means operable by movement of the accelerator pedal to a kickdown position to increase the pressure in the chamber of the clutch selector mechanism to move the valve controlling the highest speed ratio clutch to disengage said clutch.

17. In a transmission, a driving member, a final driven member, a fluid unit having fluid energizing and energy absorbing members, a starting clutch between the driving member and the fluid energizing member, a direct drive shaft, an intermediate shaft driven by the energy absorbing member, connecting means between the driving member and the direct drive shaft, a sleeve mounted on the intermediate shaft, an intermediate speed clutch operable when engaged to drive the sleeve with the intermediate shaft, a lay shaft extending parallel with the intermediate shaft, one way and direct driving gear means between the intermediate shaft and sleeve members respectively and the lay shaft, a driven sleeve mounted on the intermediate shaft, gear means interconnecting the lay shaft and the driven sleeve, one way driving means between said driven sleeve and the final driven member, and a direct drive clutch between the intermediate shaft and the final driven member.

18. In a transmission, a driving member, a final driven member, a fluid unit having fluid energizing and energy absorbing members, a starting clutch between the driving member and the fluid energizing member, a direct drive shaft, an intermediate shaft driven by the energy absorbing member, connecting means between the driving member and the direct drive shaft, a sleeve mounted on the intermediate shaft, a clutch operable when engaged to drive the sleeve with the intermediate shaft, spaced gears of small and larger diameters carried by the intermediate shaft and sleeve members respectively, a layshaft extending parallel with the intermediate shaft, a gear mounted on the layshaft and engaging the gear on the intermediate shaft, one way driving means between the layshaft and the gear mounted thereon, a gear carried by the layshaft and engaging the gear carried by the sleeve mounted on the intermediate shaft, a driving sleeve mounted on the intermediate shaft, gear means interconnecting the layshaft and the driving sleeve, one way driving means between said driving sleeve and the final driven member, and a clutch between the direct drive shaft and the final driven member.

19. In a transmission for an accelerator pedal controlled vehicle, a driving member, a final driven member, a fluid unit having fluid energizing and energy absorbing members, a starting clutch between the driving member and the fluid energizing member, a fluid pump driven by the driving member, a fluid pump driven by the final driven member, a direct drive shaft, an intermediate shaft driven by the energy absorbing member, connecting means between the driving member and the direct drive shaft, a sleeve mounted on the intermediate shaft, an intermediate speed clutch operable when engaged to drive the sleeve with the intermediate shaft, a layshaft extending parallel with the intermediate shaft, one way and direct driving gear means between the intermediate shaft and sleeve members respectively and the layshaft, a driven sleeve mounted on the intermediate shaft, gear means interconnecting the layshaft and the driven sleeve, one way driving means between said driven sleeve and the final driven member, a direct drive clutch between the direct drive shaft and the final driven member, a starting valve controlling the starting clutch, fluid pressure operated valves controlling the intermediate and direct drive clutches, fluid pressure actuated means responsive to speed increasing movement of the accelerator pedal controlling the starting valve, and means to subject one end of the valves controlling the intermediate and direct drive clutches to speed governed fluid pressure developed by the pump driven by the driven member and to subject the other end of said valves to accelerator pedal position controlled fluid pressure developed by the pump driven by the driving shaft to successively engage said clutches in response to the speed of the driven member and the position of the accelerator pedal.

20. In a transmission for a vehicle having an accelerator pedal controlled engine, a driving member, a final driven member, a direct drive shaft driven by the driving member, a direct drive clutch between the direct drive shaft and the final driven member, a fluid unit having impeller and turbine members, a clutch between the driving member and the impeller, a sleeve driven by the turbine, a one-way clutch between the sleeve and the direct drive clutch, and accelerator pedal actuated valves controlling said clutches to successively actuate the impeller driving clutch and the final driven clutch.

21. A transmission for a vehicle having an accelerator pedal controlled engine comprising a driving member, a final driven member, a direct drive shaft driven by the driving member, a direct drive clutch between said shaft and the final driven member, a fluid unit having impeller and turbine members, a clutch between the driving member and the impeller, a sleeve driven by the turbine, a one-way clutch between the sleeve and the direct drive clutch, a front pump driven by the driving member, a governor including a pump driven by the final driven member, means to supply fluid under pressure from the front pump to actuate said clutches, a master control mechanism to vary the rate of engagement of the impeller driving clutch in proportion to movement of the accelerator pedal, and means actuated by governor controlled fluid pressure influenced by the position of the accelerator pedal to engage the direct drive clutch.

22. In a transmission for a vehicle, a driving member, a final driven member, a fluid coupling having impeller and turbine members, a starting clutch between the driving member and the impeller, a direct drive shaft, connecting means between the driving member and said shaft, an intermediate shaft driven by the turbine, a sleeve mounted on the intermediate shaft, an intermediate speed clutch operable when engaged to drive the sleeve with the intermediate shaft, spaced gears of small and larger diameters carried by the intermediate shaft and sleeve members respectively, a layshaft extending parallel with the intermediate shaft, a gear mounted on the layshaft and engaging the gear on the intermediate shaft, one way driving means between the layshaft and the gear mounted thereon, a gear carried by the layshaft and engaging the gear carried by said sleeve, a second sleeve mounted on the intermediate shaft, gear means interconnecting the layshaft and said second sleeve, one way driving means between said second sleeve and the final driven member, and a direct drive clutch between the first mentioned shaft and the final driven member.

23. A transmission for a vehicle having an accelerator pedal controlled engine comprising a driving member, a final driven member, a direct drive shaft driven by the driving member, a direct drive clutch between the direct drive shaft and the final driven member, a fluid unit having impeller and turbine members, a clutch between the driving member and the impeller, a sleeve driven by the turbine, a one-way clutch between the sleeve and the direct drive clutch, a front pump driven by the driving member, a governor comprising a pump driven by the final driven member and a speed responsive member controlling the fluid pressure delivered by said pump, means to supply fluid under pressure from the front pump to actuate said clutches, a master control mechanism to vary the rate of engagement of the impeller driving clutch in proportion to movement of the accelerator pedal, means to direct front pump pressure to engage the direct drive clutch, a valve controlling said direct drive clutch engaging means, means to subject said valve to governed fluid pressure to engage the direct drive clutch, and means to subject said valve to front pump pressure proportionate to speed increasing position of the accelerator pedal to delay engagement of said clutch.

24. In a transmission for a vehicle, a housing, a driving member, a final driven member, a torque converter having impeller, turbine and reaction members, a starting clutch between the driving member and the impeller, a one-way clutch between the guide wheel and the housing, a sleeve driven by the turbine, a gear carried by the sleeve, a layshaft extending in parallel relation with the sleeve, a layshaft gear engaging the gear on said sleeve, a one-way clutch between the layshaft and the layshaft gear, an intermediate speed gear on said sleeve, an intermediate speed clutch between said sleeve and the intermediate speed gear, a gear on the layshaft engaging the intermediate gear, driving means between the layshaft and the final driven member, a shaft driven by the driving member, and a direct drive clutch between said shaft and the final driven member.

25. A transmission for a vehicle having a driving member, a final driven member, a direct drive shaft driven by the driving member, a direct drive clutch between said shaft and the final driven member, a fluid unit having impeller turbine and reaction members defining a power transmitting fluid circuit, a starting clutch between the driving member and the impeller, a stationary sleeve concentrically mounted on said shaft, one way driving means between the guide wheel member and the stationary sleeve to hold the guide wheel member against backward rotation to operate the fluid unit as a torque converter and to permit the guide wheel member to rotate forwardly in the fluid circuit to operate the fluid unit as a fluid clutch, a driving sleeve driven by the turbine and interposed between said shaft and the stationary sleeve, a low driving ratio gear carried by the driving sleeve, a layshaft positioned adjacent the driving sleeve, a gear mounted on the layshaft, one-way driving means between the layshaft and said gear mounted thereon, an intermediate ratio driving gear rotatably mounted on the driving sleeve, a gear carried by the layshaft and meshing with the intermediate ratio driving gear, an intermediate ratio driving clutch between the driving sleeve and the intermediate ratio driving gear, and one-way driving means between the layshaft and the final driven member.

26. In a transmission for a vehicle, a housing, a driving member, a final driven member, a torque converter having impeller, turbine and reaction members, a starting clutch between the driving member and the impeller, a one-way clutch between the guide wheel and the housing, a final driven shaft, connecting means between the driving member and the final driven shaft, an intermediate shaft, a gear carried by the intermediate shaft, a layshaft extending in parallel relation with the intermediate shaft, a layshaft gear engaging the gear on said intermediate shaft, a one-way clutch between the layshaft and the layshaft gear, a sleeve mounted on the intermediate shaft, an intermediate speed gear carried by the sleeve, an intermediate speed clutch between said intermediate shaft and sleeve, a gear on the layshaft engaging the intermediate speed gear carried by the sleeve, driving means between the layshaft and the final driven member, and a clutch between the direct drive shaft and the final driven member.

27. A transmission for a vehicle having an accelerator pedal controlled engine comprising a driving member, a final driven member, an intermediate shaft driven by the driving member, a direct drive clutch between said intermediate shaft and the final driven member, a fluid unit having impeller turbine and reaction members, a starting clutch between the driving member and the impeller, a stationary sleeve concentrically mounted on said shaft, one way driving means between the guide wheel member and the stationary sleeve whereby the guide wheel member may be held against backward rotation to operate the fluid unit as a torque converter or may rotate forwardly to operate the fluid unit as a fluid clutch, a driving sleeve driven by the turbine and interposed between said shaft and the stationary sleeve, a low driving ratio gear carried by the driving sleeve, a layshaft positioned adjacent the driving sleeve, a gear mounted on the layshaft, one-way driving means between the layshaft and said gear mounted thereon, an intermediate ratio driving gear rotatably mounted on the driving sleeve, a gear carried by the layshaft and meshing with the intermediate ratio driving gear, an intermediate ratio driving clutch between the sleeve and the intermediate ratio driving gear, one-way driving means between the layshaft and the final driven member, a front pump driven by the driving member, a governor comprising a pump driven by the final driven member and a speed responsive member controlling the fluid pressure delivered by said pump, means to supply fluid under pressure from the front pump to actuate said clutches, a master control mechanism to vary the rate of engagement of the starting clutch in proportion to movement of the accelerator pedal, means to direct front pump pressure to engage the intermediate and direct drive clutches, valves controlling said intermediate and direct drive clutch engaging means, means to subject said valves to governed fluid pressure to urge the valves to engage the intermediate and direct drive clutches, and means to subject said valves to front pump pressure proportionate to the position of the accelerator pedal to delay engagement of the intermediate and direct drive clutches whereby the engagement of the intermediate and direct drive clutches will successively occur at progressively higher vehicle speeds proportionate to progressively increasing movement of the accelerator pedal.

28. In a transmission for a vehicle, a housing, a driving member, a final driven member, a torque converter having impeller turbine and reaction members, a starting clutch between the driving member and the impeller, a one-way clutch between the guide wheel and the housing, a sleeve driven by the turbine, a gear carried by the sleeve, a layshaft extending in parallel relation with the sleeve, a layshaft gear engaging the gear on said sleeve, a one-way clutch between the layshaft and the layshaft gear, a secondary driving gear rotatably mounted on said sleeve, an intermediate speed clutch between said sleeve and the secondary driving gear, a gear on the layshaft engaging the secondary driving gear, driving means between the layshaft and the final driven member, a direct drive shaft driven by the driving member, a direct drive clutch between the direct drive shaft and the final driven member, a front pump driven by the driving member, a governor including a pump driven by the final driven member, an accelerator pedal, a master control mechanism having a valve member actuated by front pump fluid pressure controlled by accelerator pedal position for varying the rate of engagement of said clutches in proportion to accelerator pedal position, and other valve members actuated jointly by governed fluid pressure and front pump fluid pressure influenced by accelerator pedal position to successively engage said intermediate and direct drive clutches at vehicle speeds proportionate to accelerator pedal position.

29. In a transmission for a vehicle having an accelerator pedal controlled engine, a driving shaft, a final driven shaft, axially spaced forward and reverse driving gears interposed between the driving and final driven shafts, a coupler adapted to selectively engage one of said forward or reverse gears, a manually operable selector lever movable in opposite directions from an engine disconnecting position to forward and reverse positions, a shifter sleeve, connecting means between the selector lever and the shifter sleeve, means carried by the shifter sleeve to actuate the coupler, a hydraulically actuated starting clutch, a valve controlling the starting clutch, a source of fluid pressure, and means operable when the selector lever is in the engine disconnecting position to subject said valve to fluid pressure to prevent engagement of the starting clutch, the coupler being in partially engaged position with respect to the forward driving gear when the selector lever is in the engine disconnecting position.

30. In a transmission for a vehicle having a manually operable selector lever movable in opposite directions from an intermediate position to establish forward or reverse drive, a driving shaft, a final driven shaft, a countershaft extending in parallel relation with the driving and driven shafts, gear means to drive the countershaft from the driving shaft, selectively operable gear means between the countershaft and the final driven shaft to drive the final driven shaft in either the forward or the reverse direction, an axially shiftable coupler adapted to engage said selectively operable gear means to drive the driven shaft in either the forward or the reverse direction, the coupler and said gearing being so proportioned that when the selector lever is in the intermediate position the coupler is partially engaged with the forward drive gearing and disengages the forward drive gearing upon movement of the selector lever toward the reverse drive position when the coupler is adjacent the reverse drive gearing.

31. In a transmission for a vehicle having a manually operable selector lever movable in opposite directions from an intermediate position to establish forward or reverse drive, a driving shaft, a driven shaft, a countershaft extending in parallel relation with the driving and driven shafts, gear means to drive the countershaft from the driving shaft, axially spaced forward and reverse driving gears on the countershaft, an idler gear meshing with the countershaft reverse driving gear, a gear rotatably mounted on the driven shaft and engaging the countershaft forward driving gear, a coupler splined to the driven shaft for axial movement thereon and having internal and external gear teeth adapted to engage the countershaft driven gear or the idler gear to provide a forward or a reverse drive respectively, and connecting means between the coupler and the manually operable selector lever, the coupler being so proportioned that when the selector lever is in the intermediate position the coupler is partially engaged with the forward drive gear and disengages the forward drive gear upon movement of the selector lever toward the reverse drive position when the reverse driving gear of the coupler is adjacent the reverse idler gear.

32. In a transmission mechanism for motor vehicles, in combination, a driving shaft, a final driven shaft, and means interconnecting said shafts for obtaining a plurality of different forward speeds, said means including three separately and successively operating friction clutches and a fluid torque converter operable successively to multiply torque and as a fluid coupling to transmit power with no multiplication of torque, and one of said speeds being a direct drive independent of said torque converter, each of said separately operating clutches remaining engaged as the successively higher speed clutch is engaged.

33. In a transmission mechanism for motor vehicles, in combination, a driving shaft, a final driven shaft, means interconnecting said shafts for obtaining a plurality of different forward speeds, said means including three successively operating friction clutches and a fluid torque converter, the torque converter being successively operable to multiply torque as a fluid coupling to transmit power without torque multiplication, and one of said speeds being a direct drive through one only of said clutches and independent of said torque converter, and means responsive to the speed of the driving and final driven shafts for successively engaging said clutches.

34. In a transmission mechanism for motor vehicles, in combination, a driving shaft, a final driven shaft, a fluid transmission device driven by said driving shaft, an intermediate shaft connected to be driven by the driven element of said device, a gear on said intermediate shaft, a clutch connected to said intermediate shaft, a second gear rotatably mounted on the intermediate shaft and adapted to be driven by said clutch, a third gear mounted to rotate on said intermediate shaft, a lay shaft, gears on the lay shaft meshing with said three gears, and means for driving said final driven shaft from said third gear.

35. In a transmission mechanism for motor vehicles, in combination, a driving shaft, a final driven shaft, a fluid transmission device driven by said driving shaft, an intermediate shaft connected to be driven by the driven element of said device, a gear on said intermediate shaft, a clutch connected to said intermediate shaft, a second gear mounted on the driven shaft and adapted to be driven by said clutch, a third gear mounted to rotate on said intermediate shaft, means for driving the final driven shaft from the third gear, a lay shaft, gears on the lay shaft meshing with the said three gears, a direct drive shaft extending from said driving shaft to said final driven shaft and directly connected to the driving shaft, and friction clutch means connecting said direct drive shaft with said final driven shaft.

36. In a transmission mechanism for motor vehicles, in combination, a driving shaft, a final driven shaft, a fluid transmission device, a friction clutch connecting said driving shaft to said device, an intermediate shaft connected to the driven element of said device, two gears of different size one connected directly to said intermediate shaft and the other rotatably mounted thereon, a friction clutch between the intermediate shaft and said other gear, and gear means including a one-way clutch between said two gears and said final driven shaft for driving said final driven shaft at either one of two speeds.

37. In a transmission mechanism for motor vehicles, in combination, a driving shaft, a final driven shaft, a fluid transmission device, a friction clutch connecting said driving shaft to said device, an intermediate shaft connected to the driven element of said device, two gears of different size one connected directly to said intermediate shaft and the other rotatably mounted thereon, a friction clutch between the intermediate shaft and said other gear, and gear means including a one-way clutch between said two gears and said final driven shaft for driving said final driven shaft at either one of two speeds, a direct drive shaft extending from said driving shaft through said two gears and friction clutch to the final driven shaft, and a friction clutch between said final driven shaft and said direct drive shaft for driving said final driven shaft at a direct connected speed.

38. A control mechanism for a transmission having driving and driven members, a first source of fluid pressure, torque converter and direct drive means between said members, a hydraulically actuated friction clutch controlling the direct drive means, an accelerator pedal, and speed responsive means to provide a second source of fluid pressure dependent on the speed of the driven member, said control mechanism comprising a hydraulic system having fluid lines, and including a cylinder having a valve member defining a pressure balancing chamber, a plunger movable relative to the valve member, connecting means between the plunger and the accelerator pedal, yielding means urging the valve toward one end of the cylinder, the valve member and plunger having cooperating inlet ports adapted to align to admit fluid under pressure from said first source to the pressure balancing chamber, a clutch control valve having one of its ends subjected to fluid pressure from the pressure balancing chamber and having its other end subjected to fluid pressure from said second source that is responsive to the speed of the driven member to urge said valve toward the clutch engaging position, the pressure from the pressure balancing chamber urging said valve to delay engagement of said clutch in proportion to the position of said accelerator pedal, and said valve being positioned in the fluid supply line to said hydraulically actuated friction clutch.

39. In a transmission for an accelerator pedal controlled vehicle having driving and driven shafts, fluid pressure pumps driven by the driving and driven shafts, torque converter and direct drive means between said shafts, a friction clutch controlling the direct drive means, a hydraulic system having liquid pressure lines, and including a clutch valve controlling the operation of the direct drive friction clutch, means to subject the clutch valve to fluid pressure from one of said pumps and dependent on the speed of the driven shaft to urge said valve toward the clutch engaging position, and means to subject said valve to accelerator pedal position controlled fluid pressure from said other pump to oppose movement of said valve toward clutch engaging position, and means energized by movement of said valve to control the operation of said clutch.

40. In a transmission for an accelerator pedal controlled vehicle having driving and driven shafts, a source of fluid pressure, a low speed ratio drive and a higher speed ratio drive between said shafts, a plurality of friction means controlling said drives, a plurality of fluid pressure operated means respectively for controlling said friction means, a first valve means to supply fluid under pressure proportionate to the speed increasing position of the accelerator pedal to actuate one of said fluid pressure operated means, a selector valve means cooperating with said first valve means for supplying fluid under pressure to actuate the other of said fluid pressure operated means, means to subject the selector valve means to fluid pressure dependent on the speed of the driven shaft to urge said valve toward the opening of the supply, and means to subject the selector valve means to fluid pressure proportionate to the speed increasing position of the accelerator pedal to oppose movement of said valve toward opening of the supply whereby to control the engagement of the other of said fluid pressure operated means dependent upon the speed of the driven shaft and the speed increasing position of the accelerator pedal.

41. In a transmission for an accelerator pedal controlled vehicle having driving and driven shafts, a source of fluid pressure, a low, intermediate and direct speed ratio drives between said shafts, friction means controlling said drives, fluid pressure operated means controlling said friction means, means to supply fluid under pressure proportionate to the speed increasing position of the accelerator pedal to actuate said fluid pressure operated means, selector valves controlling the engagement of the fluid pressure operated means controlling the intermediate and direct speed ratio drives, means to subject the selector valves to fluid pressure dependent on the speed of the driven shaft to urge said valves toward their engaging positions, and means to subject said selector valves to fluid pressure proportionate to the speed increasing position of the accelerator pedal to oppose movement of said valves toward the higher speed ratio drive engaging positions.

42. In a transmission for an accelerator pedal controlled vehicle having driving and driven shafts, a source of fluid pressure, a plurality of successively engaging clutches to provide successively higher speed ratio drives above a low speed drive between the driving and driven shafts, clutch selector valves movable between nonengaging and engaging positions controlling engagement of said clutches, a control mechanism comprising movable members defining a pressure balancing chamber interposed between the source of fluid pressure and the clutch selector valves to urge said valves toward the non-engaging position, means movable in response to speed increasing movement of the accelerator pedal to increase the pressure in said chamber, one of the movable members of the control mechanism moving in response to an increase of pressure in said chamber to limit the pressure therein in proportion to the position of the accelerator pedal, means to deliver a controlled fluid pressure dependent on the speed of the driven shaft to urge said valves toward the engaging position, and said valves including means operable by movement of said valves to a predetermined position in their movement toward their engaging positions to exert on said valves an additional fluid pressure force to hold said valves in their engaging positions.

43. In a transmission for an accelerator pedal controlled vehicle, a driving shaft, a final driven shaft, source means for providing fluid pressure dependent respectively upon the position of the accelerator pedal and the speed of the final driven shaft, a torque converter and a friction clutch interposed between the driving and the final driven shafts, means interconnecting said source and said fluid pressure actuated means, fluid pressure actuated means to engage said clutch, selector means associated with said interconnecting means for controlling the engagement of said clutch, means to subject the selector means to fluid pressure dependent on the speed of the final driven shaft opposed by fluid pressure proportionate to the position of the accelerator pedal to engage said clutch and thereby providing a higher speed ratio drive at a vehicle speed proportionate to vehicle speed and accelerator pedal position, and other means associated with said interconnecting means to modulate engagement of said clutch by supplying thereto clutch engaging fluid pressure proportionate to the position of the accelerator pedal.

44. A transmission for an accelerator pedal controlled vehicle, comprising a driving shaft, a final driven shaft, a torque converter between the driving shaft and the final driven shaft, a direct drive clutch interposed between the driving shaft and the final driven shaft, source means for providing fluid pressure dependent respectively upon the position of the accelerator pedal and the speed of the final driven shaft, fluid pressure actuated means to successively transmit drive through the torque converter and the direct drive clutch, means interconnecting said source and said fluid pressure actuated means, selector means associated with said interconnecting means for controlling the engagement of the direct drive clutch, means to subject the selector means to fluid pressure dependent on the speed of the final driven shaft opposed by fluid pressure dependent on the position of the accelerator pedal, and other means associated with said interconnecting means to modulate engagement of said clutch by providing clutch engaging pressure dependent on the position of the accelerator pedal.

45. In a transmission for a vehicle, a housing, a driving member, a final driven member, source means for providing fluid pressure dependent respectively upon the position of the accelerator pedal and the speed of the final driven shaft, a torque converter having impeller turbine and reaction members, a one-way clutch between the guide wheel and the housing, a member driven by the turbine, variable speed gear means between the member driven by the turbine and the final driven member, a direct drive clutch, an accelerator pedal, fluid pressure actuated means for controlling the operation of said clutch, means interconnecting said source with said pressure actuated means, means associated with said interconnecting means to deliver a controlled fluid pressure proportionate to the position of the accelerator pedal, other means associated with said intercommunicating means to deliver a controlled fluid pressure dependent on the speed of the final driven member, and valve means actuated jointly by said accelerator controlled fluid pressure and said final driven member controlled fluid pressure for controlling the engagement of the direct drive clutch.

46. In a transmission mechanism for an accelerator controlled motor vehicle in combination, a driving shaft, a final driven shaft, means interconnecting said shafts for obtaining a plurality of different forward speeds, said means including a plurality of separate and successively operating friction clutches, said means also including a fluid torque converter operable successively to multiply torque and as a fluid coupling to transmit power with no multiplication of torque, means to connect said driving shaft to said driven shaft to provide a direct drive independent of said torque converter, means for providing fluid pressure dependent respectively upon the position of the accelerator pedal and the speed of the final driven shaft, fluid pressure actuated means to engage said clutches, means interconnecting said source of fluid pressure and said fluid pressure actuated means, selector means associated with said interconnecting means for controlling the engagement of said clutches, and means to subject the selector means to fluid pressure dependent on the speed of the final driven shaft opposed by fluid pressure proportionate to the position of the accelerator pedal to successively engage said clutches to thereby provide a higher speed ratio drive at a vehicle speed proportionate to said speed and accelerator pedal position.

47. In a transmission mechanism for an accelerator controlled motor vehicle in combination, a driving shaft, a final driven shaft, means interconnecting said shafts for obtaining a plurality of different forward speeds, said means including a plurality of separate and successively operating friction clutches, said means also including a fluid torque converter operable successively to multiply torque and as a fluid coupling to transmit power with no multiplication of torque, means to connect said driving shaft to said driven shaft to provide a direct drive independent of said torque converter, means for providing fluid pressure dependent respectively upon the position of the accelerator pedal and the speed of the final driven shaft, fluid pressure actuated means to engage said clutches, means interconnecting said source of fluid pressure and said fluid pressure actuated means, selector means associated with said interconnecting means for controlling the engagement of said clutches, and means to subject the selector means to fluid pressure dependent on the speed of the final driven shaft opposed by fluid pressure proportionate to the position of the accelerator pedal to successively engage said clutches to thereby provide a higher speed ratio drive at a vehicle speed proportionate to said speed and accelerator pedal position, and other means associated with said interconnecting means to modulate engagement of said clutches by supplying thereto clutch engaging fluid pressure proportionate to said position of the accelerator pedal.

48. In a transmission mechanism for an accelerator controlled motor vehicle in combination, a driving shaft, a final driven shaft, means interconnecting said shafts for obtaining a plurality of different forward speeds, said means including a plurality of separate and successively operating friction clutches, said means also including a fluid torque converter operable successively to multiply torque and as a fluid coupling to transmit power with no multiplication of torque, means to connect said driving shaft to said driven shaft to provide a direct drive independent of said torque converter, means for providing fluid pressure dependent respectively upon the position of the accelerator pedal and the speed of the final driven shaft, fluid pressure actuated means to engage said clutches, means interconnecting said source of fluid pressure and said fluid pressure actuated means, selector means associated with said interconnecting means for controlling the engagement of said clutches, and said selector having means defining fluid pressure balancing chamber to effect operation of the selector means dependent on the speed of the final driven shaft opposed by fluid pressure proportionate to the position of the accelerator pedal to successively engage said clutches to thereby provide a higher speed ratio drive at a vehicle speed proportionate to said speed and accelerator pedal position.

49. In a transmission mechanism for an accelerator controlled motor vehicle in combination, a driving shaft, a final driven shaft, means interconnecting said shafts for obtaining a plurality of different forward speeds, said means including a plurality of separate and successively operating friction clutches, said means also including a fluid torque converter operable successively to multiply torque and as a fluid coupling to transmit power with no multiplication of torque, means to connect said driving shaft to said driven shaft to provide a direct drive independent of said torque converter, a first source of fluid pressure responsive to the speed of said drive shaft, a second source of fluid pressure responsive to the speed of said driven shaft, a control means responsive to fluid pressure dependent respectively upon the position of the accelerator pedal and the speed of the final driven shaft, fluid pressure actuated means to engage said clutches, means interconnecting said first source of fluid pressure and said fluid pressure actuated means, said control means being associated with said interconnecting means for controlling the engagement of said clutches, and means to subject the control means to fluid pressure dependent on the speed of the final driven shaft opposed by fluid pressure proportionate to the position of the accelerator pedal to successively engage said clutches to thereby provide a higher speed ratio drive at a vehicle speed proportionate to said speed and accelerator pedal position.

FOREST R. McFARLAND.

REFERENCES CITED

The following references are of record in the file of this patent:

UNITED STATES PATENTS

| Number | Name | Date |
|---|---|---|
| 2,107,089 | Swennes | Feb. 1, 1938 |
| 2,241,764 | Bollinger et al. | May 13, 1941 |
| 2,343,955 | Cotterman | Mar. 14, 1944 |
| 2,354,257 | Greenlee | July 25, 1944 |
| 2,355,709 | Dodge | Aug. 15, 1944 |
| 2,421,190 | Dodge | May 27, 1947 |

FOREIGN PATENTS

| Number | Country | Date |
|---|---|---|
| 773,583 | France | Sept. 3, 1934 |